US007820282B2

(12) United States Patent
Haas et al.

(10) Patent No.: US 7,820,282 B2
(45) Date of Patent: *Oct. 26, 2010

(54) FOAM SECURITY SUBSTRATE

(75) Inventors: Christopher K. Haas, St. Paul, MN (US); Robert D. Taylor, Stacy, MN (US); William B. Black, Eagan, MN (US); James M. Jonza, Woodbury, MN (US); Jay M. Jennen, Forest Lake, MN (US); David L. Vall, Woodbury, MN (US); Roger J. Stumo, Shoreview, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 711 days.

This patent is subject to a terminal disclaimer.

(21) Appl. No.: 11/694,350

(22) Filed: Mar. 30, 2007

(65) Prior Publication Data

US 2007/0178295 A1 Aug. 2, 2007

Related U.S. Application Data

(63) Continuation-in-part of application No. 10/502,210, filed as application No. PCT/US03/11347 on Apr. 10, 2003, now abandoned.

(51) Int. Cl.
*B32B 3/26* (2006.01)

(52) U.S. Cl. .............. 428/315.7; 428/315.5; 428/316.6; 428/317.9; 428/319.3; 428/319.7

(58) Field of Classification Search .............. 428/315.5, 428/315.7, 316.6, 317.9, 319.3, 319.7
See application file for complete search history.

(56) References Cited

U.S. PATENT DOCUMENTS

| 3,782,870 A | 1/1974 | Schippers |
| 3,855,376 A | 12/1974 | Ono et al. |
| 3,884,606 A | 5/1975 | Schrenk |
| 3,889,270 A | 6/1975 | Hoffmann et al. |
| 4,038,350 A | 7/1977 | Jaques |

(Continued)

FOREIGN PATENT DOCUMENTS

AU    488652    4/1976

(Continued)

OTHER PUBLICATIONS

H. C. Lau et al., "Melt Strength of Polypropylene: Its Relevance to Thermoforming", Polymer Engineering and Science, (Nov. 1998), pp. 1915-1923, vol. 38, No. 11.

(Continued)

*Primary Examiner*—Hai Vo
(74) *Attorney, Agent, or Firm*—Kent S. Kokko

(57) ABSTRACT

The present invention is directed an oriented, foamed article having an integral security element, and a method of making the article. The oriented foam article is particularly useful in the preparation of printed security documents such as currency, stock and bond certificates, birth and death certificates, land titles and abstracts and the like.

22 Claims, 2 Drawing Sheets

U.S. PATENT DOCUMENTS

| | | | |
|---|---|---|---|
| 4,107,247 A | 8/1978 | Dukess | |
| 4,162,343 A | 7/1979 | Wilcox et al. | |
| 4,206,165 A | 6/1980 | Dukess | |
| 4,221,624 A | 9/1980 | Eslinger et al. | |
| 4,310,591 A | 1/1982 | Lee et al. | |
| 4,379,804 A | 4/1983 | Eisele et al. | |
| 4,503,111 A | 3/1985 | Jaeger et al. | |
| 4,518,557 A | 5/1985 | Wecker | |
| 4,536,016 A | 8/1985 | Solomon et al. | |
| 4,555,437 A | 11/1985 | Tanck | |
| 4,564,560 A | 1/1986 | Tani et al. | |
| 4,613,525 A | 9/1986 | Miyamoto et al. | |
| 4,657,811 A | 4/1987 | Boyd et al. | |
| 4,714,716 A | 12/1987 | Park | |
| 4,747,983 A | 5/1988 | Colombo | |
| 4,761,256 A | 8/1988 | Hardenbrook et al. | |
| 4,775,594 A | 10/1988 | Desjarlais | |
| 4,844,979 A | 7/1989 | Strobel et al. | |
| 4,896,901 A | 1/1990 | Ekelund | |
| 4,916,198 A | 4/1990 | Scheve et al. | |
| 4,937,134 A | 6/1990 | Schrenk et al. | |
| 4,940,736 A | 7/1990 | Alteepping et al. | |
| 5,089,318 A | 2/1992 | Shetty et al. | |
| 5,126,195 A | 6/1992 | Light | |
| 5,134,198 A | 7/1992 | Stofko, Jr. et al. | |
| 5,198,306 A | 3/1993 | Kruse | |
| 5,215,691 A | 6/1993 | Bland et al. | |
| 5,234,729 A | 8/1993 | Wheatley et al. | |
| 5,240,767 A | 8/1993 | Umezu et al. | |
| 5,264,275 A | 11/1993 | Misuda et al. | |
| 5,342,688 A | 8/1994 | Kitchin et al. | |
| 5,393,099 A | 2/1995 | D'Amato | |
| 5,429,856 A | 7/1995 | Krueger et al. | |
| 5,449,200 A | 9/1995 | Andric et al. | |
| 5,489,471 A | 2/1996 | Inoue et al. | |
| 5,536,468 A | 7/1996 | Leese | |
| 5,605,936 A | 2/1997 | DeNicola, Jr. et al. | |
| 5,618,630 A | 4/1997 | Benoit et al. | |
| 5,660,919 A | 8/1997 | Vallee et al. | |
| 5,678,863 A | 10/1997 | Knight et al. | |
| 5,698,333 A | 12/1997 | Benoit et al. | |
| 5,716,695 A | 2/1998 | Benoit et al. | |
| 5,721,806 A | 2/1998 | Lee | |
| 5,766,398 A | 6/1998 | Cahill et al. | |
| 5,824,400 A | 10/1998 | Petrakis et al. | |
| 5,834,098 A | 11/1998 | Kitamura et al. | |
| 5,871,833 A | 2/1999 | Henbo et al. | |
| 5,879,028 A | 3/1999 | Benoit | |
| 5,882,774 A | 3/1999 | Jonza et al. | |
| 5,935,696 A | 8/1999 | Benoit et al. | |
| 6,001,469 A | 12/1999 | Verardi et al. | |
| 6,008,286 A | 12/1999 | Groves | |
| 6,045,894 A | 4/2000 | Jonza et al. | |
| 6,062,604 A | 5/2000 | Taylor et al. | |
| 6,074,747 A | 6/2000 | Scholz et al. | |
| 6,096,247 A | 8/2000 | Ulsh et al. | |
| 6,096,469 A | 8/2000 | Anderson et al. | |
| 6,114,022 A | 9/2000 | Warner et al. | |
| 6,164,739 A | 12/2000 | Schulz et al. | |
| 6,288,842 B1 | 9/2001 | Florczak et al. | |
| 6,316,120 B1 | 11/2001 | Emslander | |
| 6,447,875 B1 | 9/2002 | Norquist et al. | |
| 6,495,231 B2 | 12/2002 | Benoit et al. | |
| 6,589,636 B2 | 7/2003 | Emslander et al. | |
| 6,641,910 B1 | 11/2003 | Bries et al. | |
| 6,808,657 B2 | 10/2004 | Fansler et al. | |
| 7,655,296 B2 * | 2/2010 | Haas et al. | 428/319.3 |
| 2001/0000147 A1 | 4/2001 | Benoit et al. | |
| 2001/0000236 A1 | 4/2001 | Benoit et al. | |
| 2001/0021450 A1 | 9/2001 | Ramesh | |
| 2002/0013399 A1 | 1/2002 | Groves | |
| 2002/0051867 A1 | 5/2002 | Hiraki et al. | |
| 2002/0054434 A1 | 5/2002 | Florczak et al. | |
| 2003/0072931 A1 | 4/2003 | Hebrink et al. | |
| 2004/0053044 A1 | 3/2004 | Moreno et al. | |
| 2008/0122218 A1 * | 5/2008 | Reid et al. | 283/83 |

FOREIGN PATENT DOCUMENTS

| | | |
|---|---|---|
| CA | 948820 | 6/1974 |
| EP | 1 209 518 A2 | 5/2002 |
| EP | 1 209 519 A2 | 5/2002 |
| GB | 1 439 438 | 6/1976 |
| WO | 94/28077 A1 | 12/1994 |
| WO | 94/29119 A1 | 12/1994 |
| WO | 96/00146 A1 | 1/1996 |
| WO | 97/01438 A1 | 1/1997 |
| WO | WO 97/17493 A1 | 5/1997 |
| WO | 98/13211 A1 | 4/1998 |
| WO | 99/03929 A1 | 1/1999 |
| WO | WO 99/36466 A1 | 7/1999 |
| WO | 99/54148 A1 | 10/1999 |
| WO | 99/61520 A1 | 12/1999 |
| WO | 99/67092 A1 | 12/1999 |
| WO | 99/67093 A1 | 12/1999 |
| WO | WO 00/00520 A1 | 1/2000 |
| WO | WO 00/18575 A1 | 4/2000 |
| WO | WO 00/74936 A1 | 12/2000 |
| WO | WO 00/74948 A1 | 12/2000 |
| WO | WO 01/02192 A1 | 1/2001 |
| WO | WO 01/30570 A1 | 5/2001 |
| WO | WO 01/94124 A2 | 12/2001 |
| WO | WO 01/96125 A1 | 12/2001 |
| WO | WO 02/00412 A2 | 1/2002 |
| WO | WO 02/00982 A1 | 1/2002 |
| WO | WO 02/51867 A1 | 7/2002 |

OTHER PUBLICATIONS

J. I. Raukola, "A New Technology to Manufacture Polypropylene Foam Sheet and Bioaxially Oriented Foam Film", VTT Publications 361, Technical Research Center of Finland, (1998).

J. H. Schut, "Foamed Films Find New Niches", Plastics Technology, (Feb. 2002).

R. A. Ryntz, "The Effects of Solvent and Thermal History on the Adhesion of Coatings to Thermoplastic Olefins (TPOs)", Waterborne, High-Solids, and Powder Coatings Symposium, (Feb. 22-24, 1995), pp. 514-534, Symposium Sponsored by The University of Southern Mississippi, Department of Polymer Science, and Southern Society for Coatings Technology.

* cited by examiner

FOAM SECURITY SUBSTRATE

CROSS REFERENCE TO RELATED APPLICATIONS

This application is a continuation-in-part of U.S. Ser. No. 10/502,210, filed Jul. 21, 2004; now abandoned which was a national stage filing under 35 U.S.C. 371 of International Application No. PCT/US03/11347, filed Apr. 10, 2003, which International Application was published on Dec. 24, 2003 as WO 03/106187, which in turn claims priority to U.S. Ser. No. 10/175,020, filed Jun. 18, 2002, now abandoned, the disclosure of which is incorporated by reference in their entirety herein.

FIELD OF THE INVENTION

The present invention is directed to a security substrate comprising an oriented, foamed article having an integral security element.

BACKGROUND

For the production of security documents, rag paper has been the preferred substrate for many years. Rag paper has many desirable properties including printability, foldability, and tear resistance. Paper however, is not a particularly durable substrate and may be damaged by handling, environmental exposure and water.

Polymeric security documents offer several benefits over their paper counterparts. In particular, polymeric banknotes can offer greatly increased durability and resistance to counterfeiting through the incorporation of security elements. Polymeric banknotes offer unique opportunities to incorporate security elements that are designed to discourage counterfeiting. Many patents relating to banknotes mention the possibility of a transparent window somewhere on the banknote, which offers a quick visual check for authenticity and is difficult to reproduce with copying techniques.

A requirement for polymeric banknotes is that certain physical properties are similar to the more commonly used paper banknotes. Those properties relate to tactile feel, strength, tear resistance, handling, folding, and crumple resistance. For many applications however, polymeric films do not provide the same texture and handling characteristics of paper substrates.

U.S. Pat. No. 4,536,016 teaches the use of a laminate for banknotes having biaxially oriented polymeric film and a non-printed window for the incorporation of a security feature. However, U.S. Pat. Nos. 5,698,333 and 5,935,696 discuss the shortcomings of banknotes based on the '016 teachings and offers a substrate construction primarily based on a polyolefin laminate which offers improved physical properties. U.S. Pat. Nos. 5,393,099 and 5,449,200 offer yet another alternative to '016, in which a banknote is described that includes outer layers of paper laminated to a polymeric core as a way to include paper-like properties.

U.S. Pat. No. 5,234,729 teaches polymeric laminates having a large number of layers and exhibiting optically unique properties. The '729 patent even suggests that the subject of that patent could be formed into plastic currency but fails to address the physical properties required for that application. See additional references U.S. Pat. Nos. 4,162,343, 4,937,134, and 5,089,318. U.S. Pat. No. 6,045,894 teaches multi-layered optical films with unique optical properties that can be used as security elements on certain documents of value but also fails to teach the necessary embodiments for such a film to be useful as a banknote, particularly having those physical properties required of a banknote.

SUMMARY OF THE INVENTION

The invention provides a security substrate comprising at least one oriented, high melt-strength polypropylene foam layer, and at least one security element to provide visual, tactile, or electronic authentification of the substrate and thereby deter counterfeiting. Optionally, the security substrate may further have an ink-receptive layer.

The invention further provides a multilayer article comprising at least one oriented, high melt-strength polypropylene foam layer, at least one non-foam layer, and at least one security element. Preferably the non-foam layer is a thermoplastic film layer. The security element may be integral to the foam layer, the non-foam layer, may be at the interface between the foam and non-foam layers, or may be on the surface of either the foam or non-foam layers. Preferably, the multilayer construction comprises two oriented, high melt strength polypropylene foam layers and a thermoplastic film layer disposed between the foam layers. In one embodiment, the thermoplastic film layer comprises a thermoplastic polymer that imparts stiffness to the multilayer article. In another embodiment the thermoplastic film layer is or comprises a security element, such as a hologram or optical film.

The present invention also provides a method of preparing a security substrate article comprising at least one oriented, high-melt strength polypropylene foam layer and at least one thermoplastic film layer, wherein the security element may be integral to the foam layer, the non-foam layer, may be between the foam and non-foam layers, or may be on the surface of either the foam or non-foam layers. The multilayer article may be prepared by separately preparing the foam and film layers, and laminating, bonding or otherwise affixing them together, or the separate layers may be coextruded into a multilayer article. Likewise the security element may be laminated, bonded or otherwise affixed to either the foam and/or film layer, or may be coextruded with the other layer(s) into a multilayer article.

The oriented foam article is particularly useful in the preparation of printed security documents such as currency, stock and bond certificates, birth and death certificates, checks, titles and abstracts and the like. Polymeric documents offer several benefits over their paper counterparts. In particular, polymeric security documents can offer greatly increased durability and resistance to counterfeiting through the incorporation of security elements.

A requirement for some polymeric security documents is that certain physical properties are similar to the more commonly used paper banknotes. Those properties relate to tactile feel, strength, tear resistance, handling, folding, and crumple resistance. These articles, when used as security documents, meet or exceed one or more of the requirements of the U.S. Bureau of Engraving and Printing including the crumple test, the chemical resistance test and the laundering test. Reference may be made to Bureau of Engraving standard test methods 300.002, 300.004, and 300,005.

Advantageously, the articles of the present invention provide security substrates including visual, tactile or electronic elements to ensure authenticity and to deter counterfeiting. Such security elements include, for example, color shifting, polarizing, fluorescent, phosphorescent, pearlescent, magnetic films, threads or fibers; watermarks, embossments, translucent or transparent regions, liquid crystals, holographic indicia, reverse printing, microprinting, diffraction elements, reflective elements, Moiré inducing patterns, optical lenses, microlenses, Fresnel lenses, optical filters, polarizing filters, fluorescent, phosphorescent, pearlescent, color shifting or magnetic inks, three dimensional patterns or embossments, and the like.

As used in this invention:

"High melt strength polypropylene" refers to homo- and copolymers containing 50 weight percent or more propylene monomer units, and having a melt strength in the range of 25 to 60 cN at 190° C.

"Security element" is that which provides visual, tactile or electronic authentification of the security substrate or a security document derived therefrom.

"Integral security element" means that the security element cannot be removed from the security substrate without substantially altering the appearance and function of the substrate.

"Security document" means a document that might be prone to counterfeiting, and may be taken from, but not limited to the following example: currency, stock and bond certificates, birth and death certificates, automobile titles, land titles and abstracts and the like.

"Ink receptive" means a coating, treatment or layer which that is wetted by the ink and the ink adheres thereto.

Alpha-transition temperature, $T_{\alpha c}$, means to the temperature at which crystallite subunits of a polymer are capable of being moved within the larger lamellar crystal unit. Above this temperature lamellar slip can occur, and extended chain crystals form, with the effect that the degree of crystallinity is increased as amorphous regions of the polymer are drawn into the lamellar crystal structure.

"Small-cell foam" means a foam having average cell dimensions of less than 100 micrometers (μm), preferably 5 to 50 μm (prior to orientation);

"closed-cell" means a foam that contains substantially no connected cell pathways that extend from one outer surface through the material to another outer surface;

"operating temperature" means the temperature that must be achieved in the extrusion process to melt all of the polymeric materials in the melt mix;

"exit temperature" and "exit pressure" mean the temperature and pressure of the extrudate in the final zone or zones of the extruder;

"melt solution" or "melt mixture" or "melt mix" means a melt-blended mixture of polymeric material(s), any desired additives, and blowing agent(s) wherein the mixture is sufficiently fluid to be processed through an extruder;

"neat polymer" means a polymer that contains small amounts of typical heat-stabilizing additives, but contains no fillers, pigments or other colorants, blowing agents, slip agents, anti-blocking agents, lubricants, plasticizers, processing aids, antistatic agents, ultraviolet-light stabilizing agents, or other property modifiers;

"foam density" means the weight of a given volume of foam;

"density reduction" refers to a way of measuring the void volume of a foam based on the following formula:

$$\rho_R = \left[1 - \frac{\rho_f}{\rho_o}\right] \times 100\%$$

where $\rho_R$ is the density reduction, $\rho_f$ is the foam density, and $\rho_o$ is the density of the original material;

"polydispersity" means the weight average cell diameter divided by the number average cell diameter for a particular foam sample; it is a means of measuring the uniformity of cell sizes in the sample; and is defined by the equation:

$$\text{Polydispersity} = \frac{\Sigma n_i \phi_i^2 / \Sigma n_i \phi_i}{\Sigma n_i \phi_i / \Sigma n_i}$$

"uniform" means that the cell size distribution has a polydispersity of 1.0 to 2.0;

"spherical" means generally rounded; it may include spherical, oval, or circular structure;

"polymer matrix" means the polymeric, or "non-cell," areas of a foam;

"α-olefin" means an olefin having three or more carbon atoms and having a —CH═CH$_2$ group.

"total draw ratio" means the product of the draw ratios in the machine and transverse directions, i.e=MD×CD.

DETAILED DESCRIPTION

Figure 1:
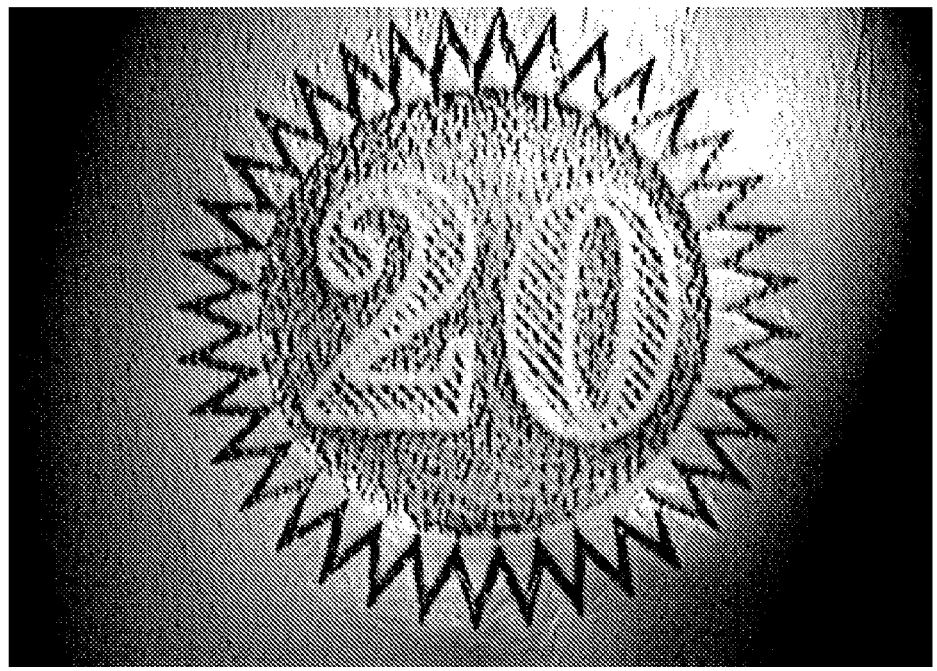
FIGS. 1 and 2 are micrographs of the security element of Example 3, in reflectance and transmittance respectively.
Figure 2:
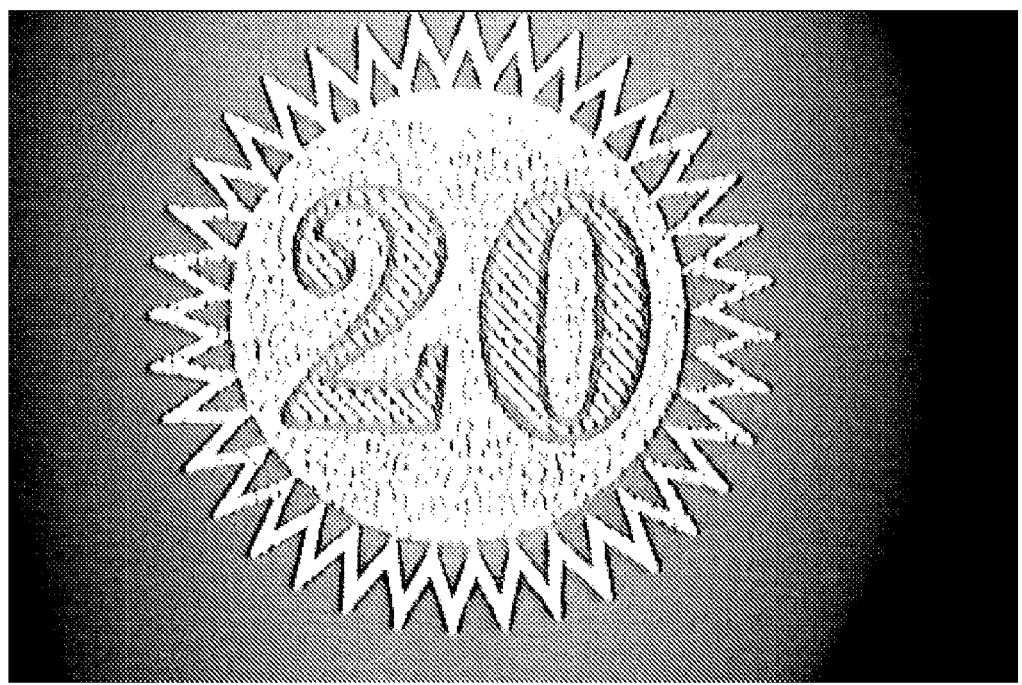
Figure 3:
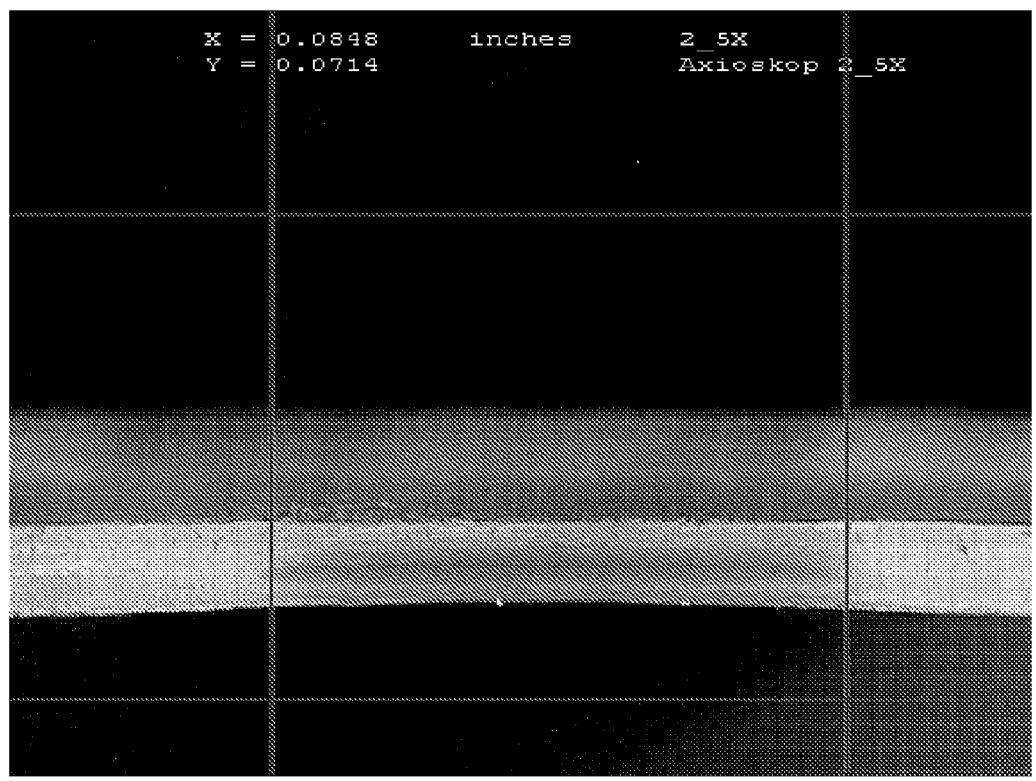
FIG. 3 is a micrograph of the unoriented article of Example 8.
Figure 4:
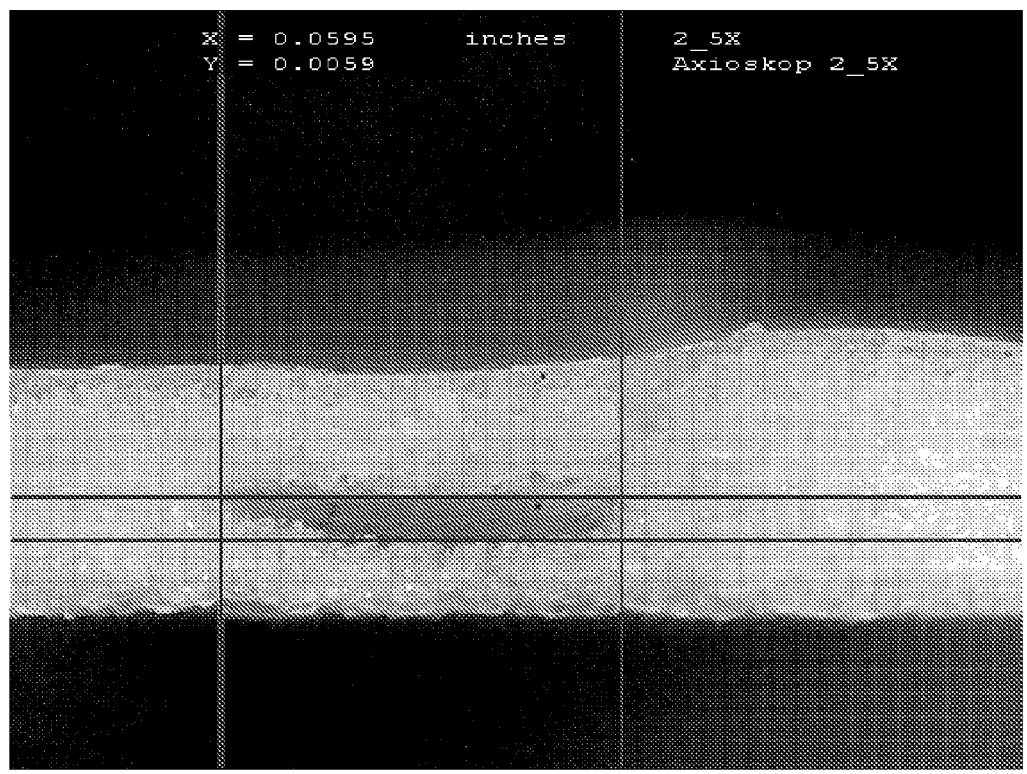
FIG. 4 is a-micrograph of the unoriented article of Example 7.

The security substrate includes one or more security elements to authenticate security documents, thus preventing forgers from producing a document, which resembles the authentic document during casual observation, but lacks the visual, tactile or electronic security elements known to be present in the authentic document.

Visual or overt security elements include those that change appearance in a reversible, predictable and reproducible manner by the application of heat or pressure, by variation in the angle of viewing, or by the adjustment of lighting conditions. Visual security elements include, for example; color shifting, metameric, polarizing, fluorescent, phosphorescent, pearlescent, holographic, reflective magnetic films, threads, particles or fibers; watermarks, embossments, transparent or translucent regions, liquid crystals; holograms, optical lenses, microlenses, Fresnel lenses, optical filters, polarizing filters, and reflective elements; photochromic elements, thermochromic elements, liquid crystals, Moiré patterns or other similar patterns produced by cross-gratings with or without superimposed, refractive, lenticular and transparent grids, embossed images or other three-dimensional elements, reverse printing, watermarks and color-shifting, metameric, polarizing, fluorescent, phosphorescent, luminescent, pearlescent, magnetic inks and combinations of the above.

Some visual security elements are visible only under certain conditions such as inspection under light of a certain wavelength, polarized light, or retroreflected light. Even more sophisticated systems require specialized electronic equipment to inspect the document and verify its authenticity, such as magnetic inks or electronic devices. Visual security elements also include three dimensional or embossed patterns on the substrate, which advantageously provides tactile authentification as well.

Tactile security elements include those elements that can be detected by feel. An individual three dimensional element may be referred to herein as an embossment, which may be imparted to the article by an embossing roll or stamp, but may also be imparted by other means such as coating, lamination, molding, extrusion and microreplication. The embossments may be in the form of a pattern, or other indicia. "Pattern" does not necessarily refer to a regular repeating array, but may mean a random array of features having the same or different sizes, as long as the three dimensional elements may be detected by feel. The number and spacing of embossments, as well as the nature of the individual embossment, such as its depth through one or more layers, degree of sharp reflecting edges, size and shape can be varied as desired.

In a multilayer security article comprising one or more foam layer and one or more non-foam layers, the security element may be integral to the foam layer, the non-foam layer, or both. The security element may further comprise a separate element on one or both major surfaces of the substrate, or may be an intermediate layer. Combinations of security elements are within the scope of the invention.

One useful security element, that is both visual and tactile, is a three dimensional pattern or embossment on a major surface of the substrate. Where the security substrate comprises a foam and a non-foam layer, such a three-dimensional embossment or pattern may be on either the foam or non-foam surface(s) or may extend through the thickness of the article. Such a three dimensional pattern may be provided by molding, extrusion using a patterned die, or embossing.

The small cell size of the foam leads to increased light scattering thereby rendering the foam layer(s) opaque without added opacifying agents. Embossing can significantly reduce the light scattering from the foam and foam cell/polymer film interfaces, leading to translucent or substantially transparent areas. By "substantially transparent" it is meant that at least about 20 percent, preferably at least 30 percent, of 400 to 700 nanometer wavelength light passes through a 1-millimeter thick region according to the test method described herein. Through the choice of embossing tooling, some areas may remain unembossed (still substantially opaque), while embossed areas are substantially transparent, allowing verification in reflected or transmitted light. Such transparent region cannot be counterfeited using a color copier or other digital imaging means. The transparency of the embossed regions, and the opacity of the unembossed regions are useful in determining that counterfeiting via the addition of a transparent film was not attempted. Other methods of providing substantially transparent regions are contemplated including vacuum, pressurized jets, peening, impingement with dot matrix print heads, tactile pressure and localized melting. Embossing of the article can provide a tactile security element, which is desirable by the visually impaired.

Such an embossing process may also provide the security substrate with an visual security element, such as a substantially transparent Fresnel lens by appropriate selection of the embossing pattern. In one embodiment, a security substrate comprising a foam layer, may be embossed to produce a substantially transparent optical security element such as a Fresnel lens, magnifying lens, microlens or other transparent optical elements. In another embodiment, a security substrate comprising a foam layer and a thermoplastic film layer may be embossed on the foam layer to reveal a security element on the film layer. In this embodiment, the optical element of the foam layer may be in registration with the security element of the film layer.

In a foam/film/foam construction, the embossing may reveal the center film by creating a substantially transparent region through the thickness of the foam layer. The center film may contain transparent colored dyes, or opaque colored pigments, or other aforementioned visual security elements that may be easily differentiated when the security document is held up to view in transmitted light. Alternatively, such a transparent region may reveal security elements of the non-foam film layer such as holograms and other optically variable element, reflective elements, metallized films or threads, photochromics, liquid crystals, Moiré patterns, polarizing elements, other transparent or translucent regions, images, indicia, watermarks and printing. Such security element would be obscured in the unembossed regions.

One particularly useful security substrate comprises an embodiment wherein a dye or colorant is added to a thermoplastic film layer in an embossed foam/film/foam construction. The dye or colorant may be added to the film layer per se, or may be added as a coextruded element, or may be added in the form or particles or threads. Normally, due to the opacity of the foam layers, the colorant in the film layer is not readily visible. However, on embossing one or both of the foam layers, a translucent or substantially transparent region is created and the colored film is revealed. However, when a fluorescent or phosphorescent dye or pigment is added, such a feature may be revealed under or reflected light without a transparent window.

The security element may comprise a multilayer optical film as described in U.S. Pat. No. 5,882,774 (Jonza et al.) or Assignee's copending U.S. patent application Ser. No. 10/139,893 filed May 6, 2002 (Hebrink et al.) this will be revealed more fully in the embossed regions, where foam cells are collapsed. In some embodiments, the embossments may extend through the foam layer and into the multilayer optical film, which will alter the optical properties of the multilayer film. Multilayer films useful for this invention include mirrors, polarizers and partial polarizers that cover any part of the visible or invisible wavelengths. Advantageously the multilayer optical film may be oriented at the same temperature as the polypropylene foams, allowing for economical, one-step manufacturing. Alternatively, the film need not be continuous if it is placed inside the foam layers via lamination. In another embodiment, printing on the internal surface(s) with ordinary or security inks may be done prior to laminating foam layers together.

The security element may comprise a polarizing film layer, such a "K-type" polarizing film. One such useful film is described in Assignee's copending application U.S. Ser. No. 10/074,874, filed Feb. 12, 2002. The polarizing film may be separately prepared and laminated, bonded or otherwise affixed to the foam layer, or the foam and polarizing film may be simultaneously coextruded and oriented. In one embodiment, the security article comprise a foam/polarizing film/foam construction where a portion on one or both of the foam layers has been embossed to provide a substantially transparent region, revealing the polarizing film.

The security element may also comprise a microlens sheeting, in which a composite image floats above or below the sheeting, or both. The composite image may be two-dimensional or three-dimensional. Methods for providing such an imaged sheeting, including by the application of radiation to a radiation sensitive material layer adjacent the microlenses, are disclosed in U.S. Pat. No. 6,288,842 (Florczak et al) and in Assignee's pending application U.S. Ser. No. 09/898,580, filed Jul. 2, 2002, and in U.S. Pat. No. 5,712,731 (Drinkwater et al., incorporated herein by reference.

The security substrate may also comprise two or more security elements, which in registration provide visual self-authentification. In one embodiment, a security substrate may have two separate polarizing elements, which when in registration allow the transmission of light, but reduce the transmission by rotation of the first polarizing element with respect to the second. Such polarizing elements may be laminated, bonded, or otherwise affixed to a thermoplastic film layer, may be coextruded with a thermoplastic film layer, or the thermoplastic film layer itself may be a polarizing film. In another embodiment, the security substrate may comprise two separate Moiré-inducing patterns which when superimposed produce dark bands known as Talbot fringes. Printing, embossing or engraving may provide the Moiré-inducing patterns on the separate elements, as is known in the art.

It will be understood by those skilled in the art that only one such security element need be present on the security substrate provided a second such element is provided. For example, the security substrate may comprise a polarizing security element. The authenticity of a security document derived therefrom may be confirmed by a separately provided polarizing filter, which, in registration provides the reduced transmission of light by rotation of the filter on the polarizing axis. Nonetheless, the self-authentifying feature of a security substrate bearing two such security elements is desirable for many applications.

Other security elements may also be practiced, such as hot stamping of holograms (transparent or aluminum vapor coated), printing with color shifting and/or magnetic inks, and laser ablation to produce small holes that become apparent when held to a strong backlight. Such security elements may by applied to the foam layer, the film layer (if present), or both layers.

If desired, coating the article with a white opacifying coating and using security printing inks is anticipated. Generally, an opacifying agent such as $TiO_2$ or $CaCO_3$ may be added to the ink-receptive coating. The foam layer is inherently opacifying because of the small foam cell size and the scattering of incident light, therefore additional opacifying agents may not be necessary. If desired, some regions may remain uncoated to allow for transparent or translucent regions of the embossments on the article, by the application of heat and/or pressure, which at least partially melts the foam layer and collapses the cells.

The oriented, high melt-strength polypropylene foam may be prepared by using a foamable mixture comprising a major amount of a high melt-strength polypropylene and a minor amount of second polymer component comprising a semicrystalline or amorphous thermoplastic polymer. Polymer mixtures and blends comprising a high melt-strength polypropylene and two or more added polymers are also within the scope of the invention.

The high melt strength polypropylene useful in the present invention includes homo- and copolymers containing 50 weight percent or more propylene monomer units, preferably at least 70 weight percent, and has a melt strength in the range of 25 to 60 cN at 190° C. Melt strength may be conveniently measured using an extensional rheometer by extruding the polymer through a 2.1 mm diameter capillary having a length of 41.9 mm at 190° C. and at a rate of 0.030 cc/sec; the strand is then stretched at a constant rate while measuring the force to stretch at a particular elongation. Preferably the melt strength of the polypropylene is in the range of 30 to 55 cN, as described in WO 99/61520.

The melt strength of linear or straight chain polymers, such as conventional isotactic polypropylene, decreases rapidly with increasing temperature. In contrast, the melt strength of highly branched polypropylenes does not decrease rapidly with increasing temperature. It is generally believed that the differences in melt strengths and extensional viscosity is attributable to the presence of long chain branching. Useful polypropylene resins are those that are branched or crosslinked. Such high melt strength polypropylenes may be prepared by methods generally known in the art. Reference may be made to U.S. Pat. No. 4,916,198 (Scheve et al) which describes a high melt strength polypropylene having a strain-hardening elongational viscosity prepared by irradiation of linear propylene in a controlled oxygen environment. Other useful methods include those in which compounds are added to the molten polypropylene to introduce branching and/or crosslinking such as those methods described in U.S. Pat. No. 4,714,716 (Park), WO 99/36466 (Moad, et al.) and WO 00/00520 (Borve et al.). High melt strength polypropylene may also be prepared by irradiation of the resin as described in U.S. Pat. No. 5,605,936 (Denicola et al.). Still other useful methods include forming a bimodal molecular weight distribution as described in J. I. Raukola, *A New Technology To Manufacture Polypropylene Foam Sheet And Biaxially Oriented Foam Film*, VTT Publications 361, Technical Research Center of Finland, 1998 and in U.S. Pat. No. 4,940,736 (Alteepping and Nebe).

The foamable polypropylene may be comprised solely of propylene homopolymer or may comprise a copolymer having 50 wt % or more propylene monomer content. Further, the foamable polypropylene may comprise a mixture or blend of propylene homopolymers or copolymers with a homo- or copolymer other than propylene homo- or copolymers. The high melt strength polypropylene may be blended with conventional polypropylene provided that the blend has the desired melt strength, i.e. 30 to 55 cN.

Particularly useful propylene copolymers are those of propylene and one or more non-propylenic monomers. Propylene copolymers include random, block, and grafted copolymers of propylene and olefin monomers selected from the group consisting of ethylene, C3-C8 α-olefins and C4-C10 dienes. Propylene copolymers may also include terpolymers of propylene and α-olefins selected from the group consisting of C3-C8 α-olefins, wherein the α-olefin content of such terpolymers is preferably less than 45 wt %. The C3-C8 α-olefins include 1-butene, isobutylene, 1-pentene, 3-methyl-1-butene, 1-hexene, 3,4-dimethyl-1-butene, 1-heptene, 3-methyl-1-hexene, and the like. Examples of C4-C10 dienes include 1,3-butadiene, 1,4-pentadiene, isoprene, 1,5-hexadiene, 2,3-dimethyl hexadiene and the like.

Minor amounts (less than 50 percent by weight) of other semicrystalline polymers that may be added to the high melt strength polypropylene in the foamable composition include high, medium, low and linear low density polyethylene, fluoropolymers, poly(1-butene), ethylene/acrylic acid copolymer, ethylene/vinyl acetate copolymer, ethylene/propylene copolymer, styrene/butadiene copolymer, ethylene/styrene copolymer, ethylene/ethyl acrylate copolymer, ionomers and thermoplastic elastomers such as styrene/ethylene/butylene/styrene (SEBS), and ethylene/propylene/diene copolymer (EPDM).

Minor amounts (less than 50 percent by weight) of amorphous polymers may be added to the high melt strength polypropylene. Suitable amorphous polymers include, e.g., polystyrenes, polycarbonates, polyacrylics, polymethacrylics, elastomers, such as styrenic block copolymers, e.g., styrene-isoprene-styrene (SIS), styrene-ethylene/butylene-styrene block copolymers (SEBS), polybutadiene, polyisoprene, polychloroprene, random and block copolymers of styrene and dienes (e.g., styrene-butadiene rubber (SBR)), ethylene-propylene-diene monomer rubber, natural rubber, ethylene propylene rubber, polyethylene-terephthalate (PETG). Other examples of amorphous polymers include, e.g., polystyrene-polyethylene copolymers, polyvinylcyclohexane, polyacrylonitrile, polyvinyl chloride, thermoplastic polyurethanes, aromatic epoxies, amorphous polyesters, amorphous polyamides, acrylonitrile-butadiene-styrene (ABS) copolymers, polyphenylene oxide alloys, high impact polystyrene, polystyrene copolymers, polymethylmethacrylate (PMMA), fluorinated elastomers, polydimethyl siloxane, polyetherimides, amorphous fluoropolymers, amorphous polyolefins, polyphenylene oxide, polyphenylene oxide—polystyrene alloys, copolymers containing at least one amorphous component, and mixtures thereof.

Preferably, the foam layers of multilayer articles range in thickness from about 20 to about 100 mils thick (~500 to 2500 micrometers (μm)). Each non-foam layer of a multilayer substrate may range from 1 to 40 mils (~25 to 1000 micrometers). If the non-foam layer is an internal stiffening layer, the thickness is generally from about 10 to 30 mils (~250 to 750 micrometers). If the non-foam layer is an ink-receptive thermoplastic film layer, the thickness is generally from about 1 to 4 mils (~25 to 100 micrometers). The overall thickness of a multilayer article may vary depending on the desired end use, but for security documents, the thickness is generally from about 20 to 120 mils (~500 to 3050 micrometers), prior to orientation. The post-orientation thickness will be less. The thickness (or volume fraction) of the multilayer article and the individual film and foam layers depend primarily on the end-use application and the desired composite mechanical properties of the multi-layered film. Such multilayer articles have a construction of at least 2 layers, preferably, at least 3 layers.

In addition to the high melt strength polypropylene, the foam layer may contain other added components such as dyes, particulate materials, a colorant, an ultraviolet absorbing material, inorganic additives, security elements and the like. Useful inorganic additives include $TiO_2$, $CaCO_3$, or high aspect ratio fillers such as wollastonite glass fibers and mica. The foam layer may also contain the security elements, particularly those that may be added to the melt and coextruded as small inclusions which have color shifting, polarizing, fluorescent, phosphorescent, luminescent, pearlescent, reflective, magnetic or holographic properties in the form of threads, particles, fibers or films.

The invention also provides multilayer security substrate comprising at least one oriented, high melt strength polypropylene foam layer, at least one non-foam layer and at least one security element. The security element may be integral to the foam layer, the non-foam layer or both. Preferably the non-foam layer is a thermoplastic film layer. For example, in a foam/film/foam construction, a substantially transparent region in the foam layer may visually reveal the film layer beneath. The film layer may, for example, be colored, may include a color shifting component, a hologram, a retroreflective component, a reflecting component, a polarizing component or other visualizable element normally obscured by the foam layer(s).

The thermoplastic film layer may be used in a multilayer construction for other purposes than providing a security element. Such layers may be added to improve the physical properties of the article, including handling characteristics such as bending stiffness. As such, a multilayer article may have the construction foam/film/foam, the inner film layer is used to improve the handling properties such as the bending stiffness. Advantageously, the foam/film/foam constructions, with the softer foam layers on the outside, feel more like paper.

Polymeric materials used in the non-foam layer of multilayer films of the present invention include one or more melt-processible organic polymers, which may include thermoplastic, or thermoplastic elastomeric materials. Thermoplastic materials are generally materials that flow when heated sufficiently above their glass transition temperature, or if semicrystalline, above the melt temperatures, and become solid when cooled.

Thermoplastic materials useful in the present invention that are generally considered nonelastomeric include, for example, polyolefins such as isotactic polypropylene, low density polyethylene, linear low density polyethylene, very low density polyethylene, medium density polyethylene, high density polyethylene, polybutylene, nonelastomeric polyolefin copolymers or terpolymers such as ethylene/propylene copolymer and blends thereof, ethylene-vinyl acetate copolymers such as those available under the trade designation ELVAX from E.I. DuPont de Nemours, Inc., Wilimington, Del.; ethylene acrylic acid copolymers such as PRIMACOR from E.I. DuPont de Nemours; ethylene methacrylic acid copolymers such as those available under the trade designation SURLYN from E.I. DuPont de Nemours, Inc.; ethylene vinyl acetate acrylate copolymers such as those available under the trade designation BYNEL from E.I. DuPont de Nemours, Inc.; polymethylmethacrylate; polystyrene; ethylene vinyl alcohol; polyesters including amorphous polyester; cycloaliphatic amorphous polyolefins such as ZEONEX available from Zeon Chemical, and polyamides. Fillers, such as clays and talcs, may be added to improve the bending stiffness of the thermoplastic materials.

In the present invention, preferred organic polymers and homo- and copolymers of polyolefins including polyethylene, polypropylene and polybutylene homo- and copolymers.

Thermoplastic materials that have elastomeric properties are typically called thermoplastic elastomeric materials. Thermoplastic elastomeric materials are generally defined as materials that act as though they were covalently crosslinked at ambient temperatures, exhibiting high resilience and low creep, yet process like thermoplastic nonelastomers and flow when heated above their softening point. Thermoplastic elastomeric materials useful in the multilayer films of the present invention include, for example, linear, radial, star, and tapered block copolymers (e.g., styrene-isoprene block copolymers, styrene-(ethylene-butylene) block copolymers, styrene-(ethylene-propylene) block copolymers, and styrene-butadiene block copolymers); polyetheresters such as that available under the trade designation HYTREL from E.I. DuPont de Nemours, Inc.; elastomeric ethylene-propylene copolymers; thermoplastic elastomeric polyurethanes such as that available under the trade designation MORTHANE from Morton International, Inc., Chicago, Ill.; polyvinylethers; poly-α-olefin-based thermoplastic elastomeric materials such as those represented by the formula —$(CH_2CHR)_x$ where R is an alkyl group containing 2 to 10 carbon atoms, and poly-α-olefins based on metallocene catalysis such as AFFINITY, ethylene/poly-α-olefin copolymer available from Dow Plastics Co., Midland, Mich.

The multilayer films are typically prepared by melt processing (e.g., extruding). In a preferred method, the foam and non-foam layers are generally formed at the same time, joined while in a molten state, and cooled. That is, preferably, the layers are substantially simultaneously melt-processed, and more preferably, the layers are substantially simultaneously coextruded. Products formed in this way possess a unified construction and have a wide variety of useful, unique, and unexpected properties, which provide for a wide variety of security document applications. The layers may also be separately prepared, then laminated, bonded or otherwise affixed together.

The security substrate may also have an optional tie layer between the foam layer, non-foam layers or security elements to improve adherence between them. Useful tie layers include extrudable polymers such as ethylene vinyl acetate polymers, and modified ethylene vinyl acetate polymers (modified with acid, acrylate, maleic anhydride, individually or in combinations). The tie layer may consist of these materials by themselves or as blends of these polymers with the thermoplastic polymer component. Use of tie layer polymers is well known in the art and varies depending on the composition of the two layers to be bonded. Tie layers for extrusion coating could include the same types of materials listed above and other materials such as polyethyleneimine, which are commonly used to enhance the adhesion of extrusion coated layers. Tie layers can be applied to the foam layer, non-foam layer or security element by coextrusion, extrusion coating, laminating, or solvent coating processes.

Depending on the polymers and additives chosen, thicknesses of the layers, and processing parameters used, the multilayer articles will typically have different properties with different numbers of layers. That is, the same property (e.g., tensile strength, modulus, bending stiffness, tear resistance) may go through maximum at a different number of layers for two particular materials when compared to two other materials. For example, the foam layer generally has good tear propagation resistance, but poorer tear initiation resistance. Thermoplastic films generally have good tear initiation resistance, but poorer tear propagation resistance. A multilayer article having both a foam and thermoplastic film layer provides both desirable attributes. Each of the non-foam layers typically includes the same material or combination of materials, although they may include different materials or combinations of materials.

Preferably the non-foam layer is a thermoplastic film layer when enhanced bending stiffness is desired. The bending stiffness may be enhanced by an internal or external layer, but is preferably an internal layer in a multilayer article. Bending stiffness may be measured using a Handle-O-Meter™ using the test method described in the Examples section. The bending stiffness of the multilayer article is preferably at least 2 times the bending stiffness of the foam layer per se, and is most preferably at least 40 N as measured using the Handle-O-Meter™. Such a value is comparable to that of paper substrates used in security documents.

Stiff materials useful in enhancing the bending stiffness comprise amorphous and semicrystalline thermoplastic homo- and copolymers (and mixtures and blends thereof). Particularly useful materials include particle filled polyolefins such as particle filled polypropylene, particularly polypropylene containing 10 to 40 weight %, $TiO_2$, $CaCO_3$, or high aspect fillers such as wollastonite, mica, or glass fibers.

Examples of other useful stiff materials include homo- and copolymers of methyl methacrylate, styrene, alkyl styrenes such as α-methyl styrene, acrylonitrile and methacrylonitrile, copolymers of ethylene and vinyl alcohol (such as EVOH), polyesters, polyamides, polyurethanes; copolymers of ethylene and cyclic olefins, such as ethylene-norbornene copolymers (such a Zeonex™), certain high modulus polypropylenes and polycarbonates.

The security substrate may optionally further comprise an ink receptive surface. One useful means to provide an ink receptive surface is in the use of special treatments to change the condition of a surface by increasing its surface energy. Surface treatments for increased surface energy include oxidizing pretreatments or the use of ink-receptive coatings. Oxidizing pre-treatments include the use of flame, ultraviolet radiation, corona discharge, plasma, chemical oxidizing agents and the like.

An ink receptive surface may be provided by first treating the foam (or film if multilayer) substrate by flame treatment, or corona treatment. These surface treatments are believed to provide three characteristics to the foam surface. The three unifying characteristics are an increase in the oxygen or amino content of the treated surface as compared to the bulk material, an increase in the hydrophilicity of the surface, and an increase in the acidity of the surface. These treatments to the surface of the substrate improve the wetting and the adhesion of the applied ink.

Another ink-receptive layer may be derived from polymeric coatings. Useful ink-receptive coating can be any polymer from water-based or organic solvent-based systems that can be coated on and adhere to the foam layer. Preferably, the ink-receptive coating is water-resistant, yet can be coated from a water-based dispersion. Nonlimiting examples of such ink receptive coatings include ethylene-acrylic acid copolymers and their salts, styrene-acrylic acid copolymers and their salts, and other (meth)acrylic moiety containing polymers, vinylpyrrolidone homopolymers and copolymers and substituted derivatives thereof, vinyl acetate copolymers (e.g., copolymers of vinylpyrrolidone and vinyl acetate; copolymers of vinyl acetate and acrylic acid, etc.) and hydrolyzed derivatives thereof, polyvinyl alcohol; halogen-substituted hydrocarbon polymers, acrylic acid homopolymers and copolymers; acrylamide homopolymers and copolymers; polyethylene imines; cellulosic polymers; styrene copolymers with allyl alcohol, acrylic acid and/or maleic acid or esters thereof, alkylene oxide polymers and copolymers; gelatins and modified gelatins; polysaccharides; and the like as disclosed in U.S. Pat. Nos. 5,766,398; 4,775,594; 5,126,195; 5,198,306.

Preferably the ink receptive layer is permanently adhered to the foam layer and may be hydrophilic, ink sorptive, coating material. The ink receptive layer may be visually transparent, translucent or opaque. The image-transparent, ink receptive layer may be prepared from a wide variety of hydrophilic, ink sorptive, coating materials. In current industry practice, the ink receptive layer typically is formulated to provide suitable ink receptivity tuned for a particular printing technique and related ink used therein. In general, suitable formulations for the ink receptive layer are disclosed in Desjarlais, U.S. Pat. No. 4,775,594; Light, U.S. Pat. No. 5,126,195; and Kruse, U.S. Pat. No. 5,198,306.

The ink receptive layer may comprise at least one hydrophilic polymer or resin that also may be water-soluble. Suitable hydrophilic polymers or resins include polyvinyl alcohols, including substituted polyvinyl alcohols; polyvinyl pyrrolidones, including substituted polyvinyl pyrrolidones; vinyl pyrrolidone/vinyl acetate copolymer; vinyl acetate/acrylic copolymers; acrylic acid polymers and copolymers; acrylamide polymers and copolymers; cellulosic polymers and copolymers; styrene copolymers of allyl alcohol, acrylic acid, maleic acid, esters or anhydride, and the like; alkylene oxide polymers and copolymers; gelatins and modified gelatins; polysaccharides; and the like. Preferred hydrophilic polymers include poly(vinyl pyrrolidone); substituted poly(vinyl pyrrolidone); poly(vinyl alcohol); substituted poly(vinyl alcohol); vinyl pyrrolidone/vinyl acetate copolymer; vinyl acetate/acrylic copolymer; polyacrylic acid; polyacrylamides; hydroxyethylcellulose; carboxyethylcellulose; gelatin; and polysaccharides.

A particularly useful ink-receptive coating includes copolymers of ethylene vinyl acetate, carbon monoxide and methyl acrylate; copolymers of acid and/or acrylate modified ethylene and vinyl acetate; and terpolymers of ethylene and any two polar monomers, for example vinyl acetate and carbon monoxide. Commercially available modified olefin resins that are useful as ink-receptive coatings include: BYNEL 3101, an acid-acrylate modified ethylene vinyl acetate copolymer; ELVALOY 741, a terpolymer of ethylene/vinyl acetate/carbon monoxide; ELVALOY 4924, a terpolymer of ethylene/vinyl acetate/carbon monoxide; ELVALOY 1218AC, a copolymer of ethylene and methyl acrylate; and FUSABOND MG-423D, a modified ethylene/acrylate/carbon monoxide terpolymer. All are available from E.I. duPont De Nemours, Wilmington Del.

Other useful ink-receptive coatings include those described in U.S. Pat. Nos. 5,721,806, 6,316,120, 5,240,767, 5,834,098, 6,495,231, 6,800,341, 6,793,859 and 6,589,636.

The ink receptive layer may also contain other water insoluble or hydrophobic polymers or resins to impart a suitable degree of hydrophilicity and/or other desirable physical and chemical characteristics. Suitable polymers or resins of this class include polymers and copolymers of styrene, acrylics, urethanes, and the like. Preferred polymers and resins of this type include a styrenated acrylic copolymer; styrene/allyl alcohol copolymer; nitrocellulose; carboxylated resin; polyester resin; polyurethane resin; polyketone resin; polyvinyl butyral resin; or mixtures thereof.

In addition to the polymeric or resin components, the ink receptive layer may contain other added components such as a dye mordant, a surfactant, particulate materials, a colorant, an ultraviolet absorbing material, an organic acid, an optical brightener, antistatic agents, antiblocking agents and the like. Dye mordants that may be used to fix the printed ink to the ink receptive layer may be any conventional dye mordant. e.g. such as polymeric quaternary ammonium salts, poly(vinyl pyrrolidone), and the like. Surfactants that are used as coating aids for the ink receptive layer may be any nonionic, anionic, or cationic surfactant. Particularly useful, are fluorosurfactants, alkylphenoxypolyglycidols, and the like.

The ink receptive layer may also contain a particulate additive. Such additives may enhance the roughness characteristics of the ink receptive surface, particularly after it has been printed. Suitable particulate additives includes inorganic particles such as silicas, chalk, calcium carbonate, magnesium carbonate, kaolin, calcined clay, pyrophylite, bentonite, zeolite, talc, synthetic aluminum and calcium silicates, diatomaceous earth, anhydrous silicic acid powder, aluminum hydroxide, barite, barium sulfate, gypsum, calcium sulfate, and the like; and organic particles such as polymeric beads including beads of polymethylmethacrylate, copoly(methylmethacrylate/divinylbenzene), polystyrene, copoly(vinyltoluene/t-butylstyrene/methacrylic acid), polyethylene, and the like. Such polymeric beads may include minor amounts of divinylbenzene to crosslink the polymers.

The ink receptive layer may also contain a colorant, e.g., a dye or pigment. This layer may contain components which strongly absorb ultraviolet radiation thereby reducing damage to underlying images by ambient ultraviolet light, e.g., such as 2-hydroxybenzophenones; oxalanilides; aryl esters and the like; hindered amine light stabilizers, such as bis(2, 2,6,6-tetramethyl-4-piperidinyl)sebacate and the like; and combinations thereof.

Organic acids which may be used to adjust the pH and hydrophilicity in the ink receptive layer typically are nonvolatile organic acids such as alkoxyacetic acids, glycolic acid, dibasic carboxylic acids and half esters thereof, tribasic carboxylic acids and partial esters thereof, aromatic sulfonic acids, and mixtures thereof. Preferred organic acids include glycolic acid, methoxy acetic acid, citric acid, malonic acid, tartaric acid, malic acid, maleic acid, fumaric acid, itaconic acid, succinic acid, oxalic acid, 5-sulfo-salicycilic acid, p-toluenesulphonic acid, and mixtures thereof. Optical brighteners that may be used to enhance the visual appearance of the imaged layer may be any conventional, compatible optical brightener, e.g., such as optical brighteners marketed by Ciba-Geigy under the trademark of Tinopal™.

Another useful ink-receptive coating is described in U.S. Pat. No. 6,008,286, which provides compositions comprising mixtures of hydrocarbon polymers, halogen-substituted hydrocarbon polymers and substituted aliphatic isocyanates which, coated from solvent, improve the bond between low energy substrates and adhesives, coatings, printing inks and the like.

Solvent based or aqueous based thermosettable primers may be used, for ink-receptive coatings, without a flame or corona preliminary treatment. U.S. Pat. No. 6,001,469 describes primers and topcoats of this type used with e.g. thermoplastic polyolefins. These materials may be suitably cured on the substrate at temperatures in the region of 130° C. for 30 minutes. Similarly WIPO publication WO 94/28077 describes aqueous-based compositions requiring heat treatment at 130° C. for 40 minutes. It is known (see e.g. R. Ryntz in "Waterborne, High Solids Powder Coatings Symposium," Univ. of Southern Mississippi 1995), that high temperature treatment may also affect the surface morphology of thermoplastic polyolefin polymers. Such changes may be beneficial in some cases, but in others the relatively high temperature for curing may be sufficiently close to the material melting point to produce substrate dimensional changes and associated problems.

Another useful ink-receptive coating composition is described in U.S. Pat. No. 6,410,636 (Groves). The reference describes a water dispersed primer composition comprising a solution of a halogenated hydrocarbon polymer in organic solvent and a dispersing agent added to the solution to form a fluid primer to be dispersed in water to provide the water dispersed primer composition. Organic solvents may be selected from cyclohexane, heptane, hexane, xylene, toluene, chlorotoluene, mixed hydrocarbon solvents and mixtures thereof.

The ink receptive coating layer may also contain inorganic particles, which have the capacity to absorb ink. In a preferred embodiment, the inorganic particles have the capacity to bind ink colorants. Because ink absorbing capacity may vary with the composition of the ink being absorbed, preferred absorbing capacities will be described in terms of water absorbing capacity. In a preferred embodiment, the organic particles have a water absorbing capacity of between 20 µl/g and 0.2 ml/g.

Suitable inorganic particles may comprise metal oxides. Preferred metal oxides include titanium oxides such as rutile, titanium monoxide, titanium sesquioxide; silicon oxides, such as silica, surfactant coated silica particles, zeolites, and surface treated derivatives thereof such as for example fluorinated silicas as described in U.S. Pat. No. 6,071,614; aluminum oxides such as aluminas, for example boehmite, pseudo-boehmite, bayerite, mixed oxides such as aluminum oxyhydroxide, alumina particles having a silica core; zirconium oxides such as zirconia and zirconium hydroxide; and mixtures thereof silicon oxides and aluminum oxides are especially preferred.

Silicas have been found to interact with pigment particles in inks and any dispersants associated with the pigment particles (in pigmented inks). Silicas useful in the invention include amorphous precipitated silicas alone or in mixture with fumed silicas. Such silicas have typical primary particle sizes ranging from about 15 nm to about 6 µm. These particle sizes have great range, because two different types of silicas are useful in the present invention. The optional fumed silicas have a much smaller particle size than the amorphous precipitated silicas and typically constitute the lesser proportion of the mixture of silicas when both are present. Generally when both are present in the mixture, the weight ratio of silicas (amorphous:fumed) ranges greater than about 1:1 and preferably greater than about 3:1.

In a preferred method in accordance with the present invention, printed indicia, such a characters, images, text, logos, etc., are applied to the ink receptive layer utilizing a printing process. Many inks may be utilized in conjunction with the present invention including organic solvent-based inks, water-based inks, phase change inks, and radiation polymerizable inks. Depending on the printing technique used, preferred inks may include water-based inks. Inks utilizing various colorants may be utilized in conjunction with the present invention. Examples of colorants, which may be suitable in some applications, include dye-based colorants, and pigment based colorants. Examples of printing methods, which may be suitable include laser printing, gravure printing, offset printing, silk screen printing, electrostatic printing, intaglio and flexographic printing.

The oriented, high melt-strength polypropylene foam may be prepared by the steps of:

(1) mixing at least one high melt strength polypropylene and at least one blowing agent in an apparatus having an exit shaping orifice at a temperature and pressure sufficient to form a melt mixture wherein the blowing agent is uniformly distributed throughout the polypropylene;

(2) reducing the temperature of the melt mixture at the exit of the apparatus to an exit temperature that is no more than 30° C. above the melt temperature of the neat polypropylene while maintaining the melt mixture at a pressure sufficient to prevent foaming;

(3) passing the mixture through said exit shaping orifice and exposing the mixture to atmospheric pressure, whereby the blowing agent expands causing cell formation resulting in foam formation, and (4) orienting said foam.

The foams thus produced have average cell sizes less than 100 micrometers, and advantageously may provide foams having uniform, average cell sizes less than 50 micrometers, prior to the orientation step. Additionally the foams produced have a closed cell content of 70 percent or greater. As result of extrusion, and subsequent orientation, the original spherical cells may be elongated in the machine direction to assume an oblate ellipsoidal configuration. The small cell size of the foams increase the light scattering, and advantageously render the foam opaque without the addition of opacifying agents.

An extrusion process using a single-screw, double-screw or tandem extrusion system may prepare the foams of the present invention. This process involves mixing one or more high melt strength propylene polymers (and any optional polymers to form a propylene polymer blend) with a blowing agent, e.g., a physical or chemical blowing agent, and heating to form a melt mixture. The temperature and pressure conditions in the extrusion system are preferably sufficient to maintain the polymeric material and blowing agent as a homogeneous solution or dispersion. Preferably, the polymeric materials are foamed at no more than 30° C. above the melting temperature of the neat polypropylene thereby producing desirable properties such as uniform and/or small cell sizes.

When a chemical blowing agent is used, the blowing agent is added to the neat polymer, mixed, heated to a temperature above the $T_m$ of the polypropylene (within the extruder) to ensure intimate mixing and further heated to the activation temperature of the chemical blowing agent, resulting in decomposition of the blowing agent. The temperature and pressure of the system are controlled to maintain substantially a single phase. The gas formed on activation is substantially dissolved or dispersed in the melt mixture. The resulting single-phase mixture is cooled to a temperature no more than 30° C. above the melting temperature of the neat polymer, while the pressure is maintained at or above 1000 psi (6.9 MPa), by passing the mixture through a cooling zone(s) in the extruder prior to the exit/shaping die. Generally the chemical blowing agent is dry blended with the neat polymer prior to introduction to the extruder, such as in a mixing hopper.

With either a chemical or physical blowing agent, as the melt mixture exits the extruder through a shaping die, it is exposed to the much lower atmospheric pressure causing the blowing agent (or its decomposition products) to expand. This causes cell formation resulting in foaming of the melt mixture. When the melt mixture exit temperature is at or below 30° C. above the $T_m$ of the neat polypropylene, the increase in $T_m$ of the polymer as the blowing agent comes out of the solution causes crystallization of the polypropylene, which in turn arrests the growth and coalescence of the foam cells within seconds or, most typically, a fraction of a second. This preferably results in the formation of small and uniform voids in the polymeric material. When the exit temperature is no more than 30° C. above the $T_m$ of the neat polypropylene, the extensional viscosity of the polymer increases as the blowing agent comes out of the solution and the polypropylene rapidly crystallizes. When a high melt strength polypropylene is used, the extensional thickening behavior is especially pronounced. These factors arrest the growth and coalescence of the foam cells within seconds or, most typically, a fraction of a second. Preferably, under these conditions, the formation of small and uniform cells in the polymeric material occurs. When exit temperatures are in excess of 30° C. above the $T_m$ of the neat polymer, cooling of the polymeric material may take longer, resulting in non-uniform, unarrested cell growth. In addition to the increase in $T_m$, adiabatic cooling of the foam may occur as the blowing agent expands.

Either a physical or chemical blowing agent may plasticize, i.e., lower the $T_m$ and $T_g$ of, the polymeric material. With the addition of a blowing agent, the melt mixture may be processed and foamed at temperatures considerably lower than otherwise might be required, and in some cases may be processed below the melt temperature of the high melt strength polypropylene. The lower temperature can allow the foam to cool and stabilize i.e., reach a point of sufficient solidification to arrest further cell growth and produce smaller and more uniform cell sizes.

Chemical blowing agents are added to the polymer at a temperature below that of the decomposition temperature of the blowing agent, and are typically added to the polymer feed at room temperature prior to introduction to the extruder. The blowing agent is then mixed to distribute it throughout the polymer in undecomposed form, above the melt temperature of the polypropylene, but below the activation temperature of the chemical blowing agent. Once dispersed, the chemical blowing agent may be activated by heating the mixture to a temperature above its decomposition temperature of the agent. Decomposition of the blowing agent liberates gas, such as $N_2$, $CO_2$ and/or $H_2O$, yet cell formation is restrained by the temperature and pressure of the system. Useful chemical blowing agents typically decompose at a temperature of 140° C. or above and may include decomposition aides. Blends of blowing agents may be used.

Examples of such materials include synthetic azo-, carbonate-, and hydrazide-based molecules, including azodicarbonamide, azodiisobutyronitrile, benzenesulfonhydrazide, 4,4-oxybenzene sulfonyl-semicarbazide, p-toluene sulfonyl semi-carbazide, barium azodicarboxylate, N,N'-dimethyl-N,N'-dinitrosoterephthalamide and trihydrazino triazine. Specific examples of these materials are Celogen OT (4,4'oxy-bisbenzenesulfonylhydrazide), Hydrocerol BIF (preparations of carbonate compounds and polycarbonic acids), Celogen AZ (azodicarbonamide) and Celogen RA (p-toluenesulfonyl semicarbazide). Other chemical blowing agents include endothermic reactive materials such as sodium bicarbonate/citric acid bends that release carbon dioxide. Specific examples include Reedy International Corp SAFOAM™ products.

The amount of blowing agent incorporated into the foamable polymer mixture is chosen to yield a foam having a void content in excess of 10%, more preferably in excess of 20%, as measured by density reduction. Generally, greater foam void content reduces the foam density, weight and material costs for subsequent end uses.

A single stage extrusion apparatus can be used to make the foams, and is the preferred process for use with chemical blowing agents. A twin-screw extruder may be used to form a melt mixture of the polypropylene and blowing agent, although it will be understood that a single screw extruder may also be used. The polypropylene is introduced into an extruder by means of a hopper. Chemical blowing agents are typically added with the polymer but may be added further downstream. A physical blowing agent may be added using fluid handling means at a location downstream from a point at which the polymer has melted.

When a chemical blowing agent is used, an intermediate zone is generally maintained at an elevated temperature sufficient to initiate the chemical blowing agent, followed by subsequent cooler zones. The temperature of the initial zone (s) of the extruder must be sufficient to melt the polypropylene and provide a homogenous melt mixture with the blowing agent(s). The final zone or zones of the extruder are set to achieve the desired extrudate exit temperature. Using a single stage extrusion process to produce a homogeneous foamable mixture requires mixing and transitioning from an operating temperature and pressure to an exit temperature and pressure over a shorter distance. To achieve a suitable melt mix, approximately the first half of the extruder screw may have mixing and conveying elements which knead the polymer and move it through the extruder. The second half of the screw may have distributive mixing elements to mix the polymer material and blowing agent into a homogeneous mixture while cooling.

The operating and exit pressures (and temperatures) should be sufficient to prevent the blowing agent from causing cell formation in the extruder. The operating temperature is preferably sufficient to melt the polymer materials, while the last zone or zones of the extruder are preferably at a temperature that will bring the extrudate to the exit temperature.

At the exit end of the extruder, the foamable, extrudable composition is metered into a die having a shaping exit orifice. In general, as the blowing agent separates from the melt mixture, its plasticizing effect on the polymeric material decreases and the shear viscosity and elastic modulus of the polymeric material increases. The shear viscosity increase is much sharper at the $T_m$ than at the $T_g$, making the choice of foaming temperatures for semicrystalline polymers much more stringent than for amorphous polymers. As the temperature of the polymeric material approaches the $T_m$ of the neat polymer and becomes more viscous, the cells cannot as easily expand or coalesce. As the foam material cools further, it solidifies in the general shape of the exit-shaping orifice of the die.

The blowing agent concentrations, exit pressure, and exit temperature can have a significant effect on the properties of the resulting foams including foam density, cell size, and uniformity and distribution of cell sizes. In general, the lower the exit temperature, the more uniform, and smaller the cell sizes of the foamed material. This is because at lower exit temperatures, the extensional viscosity is higher, yielding slower cell growth. Extruding the material at lower than normal extrusion temperatures, i.e. no more than 30° C. above the $T_m$ of the neat polymeric material, produces foams with small, uniform cell sizes.

In general, as the melt mixture exits the die, it is preferable to have a large pressure drop over a short distance. Keeping the solution at a relatively high pressure until it exits the die helps to form uniform cell sizes. Maintaining a large pressure drop between the exit pressure and ambient pressure can also contribute to the quick foaming of a melt mixture. The lower limit for forming a foam with uniform cells will depend on the particular blowing agent/polymer system being used. In general, for the high melt strength polypropylene useful in the invention, the lower exit pressure limit for forming acceptably uniform cells is approximately 7 MPa (1000 psi), preferably 10 MPa (1500 psi), more preferably 14 MPa (2000 psi). The smallest cell sizes may be produced at low exit temperatures and high blowing agent concentrations. However at any given temperature and pressure, there is a blowing agent concentration at and above which polydispersity will increase because the polymer becomes supersaturated with blowing agent and a two phase system is formed.

The optimum exit temperature, exit pressure, and blowing agent concentration for a particular melt mixture will depend on a number of factors such as the type and amount of polymer(s) used; the physical properties of the polymers, including viscosity; the mutual solubility of the polymer(s) and the blowing agent; the type and amount of additives used; the thickness of the foam to be produced; the desired density and cell size; whether the foam will be coextruded with another foam or an unfoamed material; and the die gap and die orifice design.

Further details regarding the preparation of the high melt strength oriented foams may be found in Assignee's U.S. Pat. No. 7,094,463 (Haas et al.).

In order to optimize the physical properties of the foam, the polymer chains need to be oriented along at least one major axis (uniaxial), and may further be oriented along two major axes (biaxial). The degree of molecular orientation is generally defined by the draw ratio, that is, the ratio of the final length to the original length.

Upon orientation, greater crystallinity is imparted to the polypropylene component of the foam and the dimensions of the foam cells change. Typical cells have major directions X and Y, proportional to the degree of orientation in the machine and transverse direction respectively. A minor direction Z, normal to the plane of the foam, remains substantially the same as (or may be moderately less than) the cross-sectional dimension of the cell prior to orientation and therefore the density of the foam decreases with orientation. Subsequent to orientation, the cells are generally oblate ellipsoidal in shape.

The conditions for orientation are chosen such that the integrity of the foam is maintained. Thus when stretching in the machine and/or transverse directions, the orientation temperature is chosen such that substantial tearing or fragmentation of the continuous phase is avoided and foam integrity is maintained. The foam is particularly vulnerable to tearing, cell rupture or even catastrophic failure if the orientation temperature is too low or the orientation ratio(s) is/are excessively high. Generally the foam is oriented at a temperature between the glass transition temperature and the melting temperature of the neat polypropylene. Preferably, the orientation temperature is above the alpha transition temperature of the neat polymer. Such temperature conditions permit optimum orientation in the X and Y directions without loss of foam integrity.

After orientation the cells are relatively planar in shape and have distinct boundaries. Cells are generally coplanar with the major surfaces of the foam, with major axes in the machine (X) and transverse (Y) directions (directions of orientation). The sizes of the cells are uniform and proportional to concentration of blowing agent, extrusion conditions and degree of orientation. The percentage of closed cells does not change significantly after orientation when using high melt strength polypropylene. In contrast, orientation of conventional polypropylene foam results in cell collapse and tearing of the foam, reducing the percentage of closed cells. Cell size, distribution and amount in the foam matrix may be determined by techniques such as scanning electron microscopy. Advantageously, the small cell sizes increase the opacity of the foam article, compared to foams having larger cell sizes, and opacifying agents may not be required.

In the orienting step, the foam is stretched in the machine direction and may be simultaneously or sequentially stretched in the transverse direction. The stretching conditions are chosen to increase the crystallinity of the polymer matrix and the void volume of the foam. It has been found that an oriented foam has significantly enhanced tensile strength, even with a relatively low density when compared to unoriented foams.

The foam may be biaxially oriented by stretching in mutually perpendicular directions at a temperature above the alpha transition temperature and below the melting temperature of the polypropylene. Generally, the film is stretched in one direction first and then in a second direction perpendicular to the first. However, stretching may be effected in both directions simultaneously if desired. If biaxial orientation is desired, it is preferable to simultaneously orient the foam, rather than sequentially orient the foam along the two major axes. It has been found that simultaneous biaxial orientation provides improved physical properties such as tensile strength and tear resistance as compared to sequential biaxial orientation, and enables the preparation of a foam/non-foam multilayer construction where the non-foam layer is a lower melting polymer. This simultaneous biaxial orientation may be done on either a flat or tubular film line.

Multilayer articles comprising the simultaneous biaxially oriented foam are also within the scope of the invention. However, a foam layer may be prepared, oriented and subsequently laminated to a separately prepared oriented or unoriented thermoplastic film layer. If a multilayer article comprises a foam/thermoplastic film (which may have an inegral security element) is desired, it is preferable to coextrude the layers and simultaneously biaxially orient the composite article.

In a typical sequential orientation process, the film is stretched first in the direction of extrusion over a set of rotating rollers, and then is stretched in the direction transverse thereto by means of a tenter apparatus. Alternatively, foams may be stretched in both the machine and transverse directions in a tenter apparatus. Foams may be stretched in one or both directions 3 to 70 times total draw ratio (MD×CD). Generally greater orientation is achievable using foams of small cell size; foams having cell size of greater than 100 micrometers are not readily oriented more than 20 times, while foams having a cell size of 50 micrometers or less could be stretched up to 70 times total draw ratio. In addition foams with small average cell size exhibit greater tensile strength, elongation to break enhanced bonding properties, and opacity after stretching.

The temperature of the polymer foam during the first orientation (or stretching) step affects foam properties. Generally, the first orientation step is in the machine direction. Orientation temperature may be controlled by the temperature of heated rolls or by the addition of radiant energy, e.g., by infrared lamps, as is known in the art. A combination of temperature control methods may be utilized. Too low an orientation temperature may result in tearing the foam and rupturing of the cells. Too high an orientation temperature may cause cell collapse and adhesion to the rollers. Orientation is generally conducted at temperatures between the glass transition temperature and the melting temperature of the neat polypropylene, or at about 110-170° C., preferably 110-140° C. A second orientation, in a direction perpendicular to the first orientation may be desired. The temperature of such second orientation is generally similar to or higher than the temperature of the first orientation.

After the foam has been stretched it may be further processed. For example, the foam may be annealed or heat-set by subjecting the foam to a temperature sufficient to further crystallize the polypropylene while restraining the foam against retraction in both directions of stretching.

If desired, substantially transparent or translucent regions may be imparted to the foam article or the multilayer article by embossing the article under heat and/or pressure by techniques known in the art. An embossing step may occur immediately after extrusion of the foam, as a separate step, or during a subsequent printing or coating process, however, the embossing step is preferably performed on the oriented article. The embossing collapses the cells of the foam layer resulting in a transparent or translucent region that resists photocopying.

The final thickness of the foam will be determined in part by the extrusion thickness, the degree of orientation, and any additional processing. The process provides thinner foams than are generally achievable by prior art processes. Most foams are limited in thickness by the cell size. The small cell sizes (<50 micrometers) in combination with the orientation allows foam thickness of 1 to 100 mils (~25 to 2500 micrometers) and greater opacity than larger cell foams. For security document applications, it is preferred that the thickness of the oriented foam layer(s) be from about 1 to 10 mils (~25 to 259 micrometers), preferably 2 to 6 mils (~50 to 150 micrometers).

The oriented foam layer of the security substrate, when prepared by the methods described herein and further described in Assignee's U.S. Pat. No. 7,094,463 and U.S. Pat. No. 6,468,451 (Perez et al.), have two foam surfaces; i.e. have a foam morphology at both major surfaces (excepting the security elements integral thereto), and through the thickness thereof. Such a foam surface will not preclude a foam skin surface that is the result of localized melting of the foam during production. Further, the surfaces of the foam layer are substantially smooth, i.e. one that is substantially continuous and free of visible features in reflected light by visual observation of the foam surface at a wide variety of possible angles (excepting the security elements integral thereto). Visual features that may be observed include but are not limited to pock marks, lumps, fibrous structures, sharp or angular protrusions and/or indentations or substantial waviness, or other non-cellular visual indicators known to one of ordinary skill in foam production. Typically, visual observation is accomplished by looking at the reflection of a light source from the foam surface at an angle of about 60 degrees from perpendicular.

More particularly the foam layers have two smooth surfaces when measured by a profilometer according to ANSI B46. The foam layers, may have one of more of an $R_A$ value, the average surface roughness calculated over the entire measured array, of $\leq 10$ µm, preferably $\leq 5$ µm, an $R_q$ value, the root-mean-square roughness calculated over the entire measured array, of $\leq 10$ µm, preferably $\leq 5$ µm, an $R_z$ value, the average of the ten great peak-to-valley separations in the sample, of $\leq 100$ µm, preferably $\leq 50$ µm, and an $R_t$ value, the peak to valley difference over the entire measured array, of $\leq 100$ µm, preferably $\leq 50$ µm, an $R_v$ value, the maximum profile valley depth; the height difference between the mean line and the lowest point over the entire evaluation length, of $\geq -100$ µm, preferably $\geq -50$ µm, a $R_{vm}$ value, the maximum profile valley depth; the average of the successive $R_v$ values over the evaluation length, of of $\geq -100$ µm, preferably $\geq -50$ µm, and a $R_{pm}$ value, the average maximum profile peak height; the average of the successive $R_p$ values over the evaluation length, of $\leq 50$ µm, preferably $\leq 25$ µm.

The present invention may be used to produce multilayer articles comprising at least one high melt strength polypropylene foam layer. The foams may be coextruded with materials having substantially higher or lower processing temperatures from that of the foam, while still obtaining the desired structures and cell sizes. It would be expected that exposing the foam to an adjacent hot polymer as it is extruded, might cause the foam cells, especially those in direct contact with the hotter material, to continue to grow and coalesce beyond their desired sizes or might cause the foam material to melt or collapse. The foams may be coextruded with a non-foam thermoplastic polymer layer, or may be coextruded with an ink-receptive layer. Advantageously, the thermoplastic film layer may be a security element, such as those previously described.

Alternatively, the foam layer may be bonded, laminated or otherwise affixed to a separately prepared thermoplastic polymer film layer or ink-receptive layer. The foam layer may also be melt coated with a thermoplastic polymer film layer or ink-adhesive layer. The security element, which may be a thermoplastic film, may also be bonded, laminated or otherwise affixed to a separately prepared thermoplastic polymer film layer or foam layer. In another embodiment, the security element may comprise a separate layer that is bond, laminated or otherwise affixed between the foam and thermoplastic film layers.

The coextrusion process of the present invention may be used to make a foam material comprising two layers or more. A layered material or article may be produced by equipping a die with an appropriate feedblock, e.g., a multilayer feedblock, or by using a multi-vaned or multi-manifold die such as a 3-layer vane die available from Cloeren, Orange, Tex. Materials or articles having multiple adjacent foam layers may be made with foam layers comprising the same or different materials. Foam articles of the present invention may comprise one or more interior and/or exterior foam layer(s). In such a case, each extrudable material, including the high melt strength polypropylene foamable material, may be processed using one of the above-described extrusion methods wherein melt mixtures are fed to different inlets on a multi-layer feedblock, or multi-manifold die, and are brought together prior to exiting the die. The multi-layer process can also be used to extrude the foam of this invention with other types of materials such as thermoplastic films, which may provide a security element or tie layer(s). When a multi-layered article is produced, it is preferable to form adjacent layers using materials having similar viscosities and which provide interlayer adhesion. When the multilayer article comprises a foam layer and a film layer (on one or both surfaces), greater degrees of orientation, and improved tensile properties, may be possible than with single layer foam.

Advantageously the security element may be incorporated into the foam layer(s) or the thermoplastic film layer by an "inclusion-coextrusion" process, such as those described in U.S. Pat. No. 6,447,875 (Norquist et al) and U.S. Pat. No. 5,429,856 (Krueger et al.). By this process, at least one, preferably a plurality of security element "cores' are embedded in the matrix of either the foam or the thermoplastic film. The cores are continuous in the direction of extrusion (longitudinal), laterally spaced, and discontinuous in the transverse direction. The thermoplastic polymer of the core(s) may the same or different than that of the foam layer(s) or the thermoplastic film layer(s). The number of cores, the cross-sectional size and shape may be varied as desired.

The core security elements comprise a melt processible thermoplastic polymer and a visual security element dissolved or dispersed therein. Useful materials for a core security element that may be dissolved or dispersed in the thermoplastic polymer of the core include dyes, pigments, and color shifting, polarizing, fluorescent, phosphorescent, pearlescent, reflective, metallic, and magnetic particles. Alternatively, the core may comprise a thermoplastic polymer that is inherently colored, fluoresent, phosphoresecent, color-shifting, or polarizing. For example, the core may comprise polyethylene naphthalate, which fluoresces under UV light.

The core elements may be fully embedded in a foam layer, a thermoplastic film layer, or may be embedded at the interface between adjacent film and/or foam layers in a multilayer construction. For example, the security substrate may comprise a foam/foam construction wherein core element(s) are embedded at the interface between the two layers. Alternatively, the security article may comprise a foam/film/film construction wherein the core element(s) are embedded at the interface between the adjacent film layers, or between the foam and film layers. Further, the security article may comprise a foam/thermoplastic film/foam construction wherein the thermoplastic film comprises a plurality of security element cores embedded in the thermoplastic film matrix. In this embodiment, the security elements may be revealed through the opaque foam layers by substantially transparent regions in the foam layer(s) or by tactile depression of the foam layers. In some embodiments, such transparent regions may not be necessary such as with fluorescent or phosphorescent core elements.

Multilayer foam articles can also be prepared by laminating nonfoam layers to a foam layer, or by layering extruded foams as they exit their respective shaping orifices, with the use of some affixing means such as an adhesive. Useful laminated constructions include the high melt strength polypropylene foam layer with a thermoplastic film layer or a scrim layer, such as a non-woven layer or a paper layer. Such non-woven layers or paper layers may optionally include security elements as previously described. Other techniques that can be used include extrusion coating and inclusion coextrusion, which is described in U.S. Pat. No. 5,429,856. The multilayer article may be oriented as previously described.

The optional ink-receptive surface may comprise an surface treatment, such as corona, plasma or flame-treatment of the foam or non-foam (film) surface, or may comprise an ink-receptive coating, such as a primer coating, on the foam surface, or may comprise a laminated or coextruded polymer film that is ink-receptive.

Nitrogen corona treatment can be carried out on any commercial corona treater as will be known to those skilled in the art. The corona area is purged with nitrogen, to an oxygen concentration of less than 200 ppm and preferably less than 50 ppm. The corona energy should be between 0.1 and 5.0 J/cm$^2$. The temperature of the polypropylene foam substrate during nitrogen corona treatment should be above the glass transition temperature of the film but less than the melting point of the film, preferably at room temperature.

The preferred oxygen concentration, at the corona, for this process, is less than 200 ppm and most preferred less than 20 ppm. A side benefit of these low oxygen concentrations, is that no environmental control of emissions is necessary because of the low levels of $NO_X$ and $O_3$ produced.

Flame treatment can be carried out on any commercial gas flaming equipment known to those skilled in the art. Either high-velocity or ribbon burners may be used. The air:fuel ratio of the combustion mixture must be less than the stochiometric ratio (typically 9.6 for air:natural gas mixtures) and preferably between 8.8 and 9.4 by volume. This air:fuel mixture produces a so-called "reducing" or "rich" flame. Although natural gas with an energy value of approximately 1000 BTU/ft$^3$ is the preferred fuel, other gaseous hydrocarbons such as acetylene, ethane, propane, butane, or liquefied petroleum gas (LPG) can also be used, provided that the air:fuel ratio is adjusted to less than stochiometric. Although air is the preferred oxidizer, oxygen or oxygen-enriched air can be used, again provided that the air:fuel ratio is adjusted to less than stochiometric.

The desired flow rate of fuel may be adjusted to provide the optimal thermal output for a given width, thickness, and processing speed of the polypropylene foam backing. The volume of gas burned should be 0.4-6.0 liters of natural gas per square meter of polypropylene foam to be flamed, and preferably between 0.6-1.5 liters of natural gas/m$^2$ polypropylene foam. Exposure times to the flame should be between 0.001-0.05 seconds to prevent thermal damage to the polypropylene foam.

Flame treating equipment that may be suitable in some applications is commercially available from Flynn Burner Corporation of New Rochelle N.Y., USA, The Aerogon Company Ltd. of Alton, United Kingdom; and Sherman Treaters Ltd. of Thame, United Kingdom. Corona treating equipment which may be suitable in some applications is commercially available from Enercon Industries Corporation of Menomonee Falls, Wis., USA; Pillar Technologies of Hartland, Wis., USA; and Corotec Corporation of Farmington, Conn., USA.

When using a ink-receptive coating on an oriented foam substrate, the ink receptive layer has a weight of between about 0.5 and about 250 g/m$^2$. In a preferred embodiment, the image receptive layer has a weight of between about 1 and about 100 g/m$^2$. In a particularly preferred embodiment, the image receptive layer has a weight of between about 2 and about 50 g/m$^2$. It is to be appreciated that the coating weight can vary depending on fillers, inorganic materials, additives, etc.

Examples of application techniques for the ink receptive coating, which may be suitable in some applications, include coating, printing, dipping, spraying, and brushing. Examples of coating processes that may be suitable in some applications include direct and reverse roll coating, knife coating, spray coating, flood coating, and extrusion coating. Examples of printing processes that may be suitable in some applications include screen-printing, flexographic and gravure printing.

A coating solution of the ink-receptive layer may include a thickener. In particular the thickener may be selected to provide a combination of high viscosity at low shear rates and low viscosity at high shear rates. Examples of thickeners that may be suitable in some applications include: starch, gum arabic, guar gum, and carboxymethylcellulose. Additionally, the coating solution may further comprise an opacifying agent, such as has been described and is known in the art.

The coating solution may include various solvents without deviating from the spirit and scope of the present invention. In a preferred embodiment, the solvent and the particles of the coating solution are selected so that the particles are substantially insoluble in the solvent. Preferable solvents comprise water and/or glycol ethers (e.g., diethylene glycol).

In some applications it may be advantageous to include a surfactant in the coating solution to aid in wetting the substrate. Examples of surfactants that may be suitable in some applications include anionic surfactants, cationic surfactants, nonionic surfactants, and zwitterionic surfactants. Examples of trade designations for surfactants include ZONYL and FLUORAD. ZONYL FSN is a trade designation for a fluorinated surfactant available from E. L Du Pont de Nemours Corporation of Wilmington, Del., USA. FLUORAD FC-754 WELL STIMULATION ADDITIVE is a trade designation for a fluorinated surfactant available from Minnesota Mining and Manufacturing (3M Company) of St. Paul, Minn., USA.

Useful surfactants for application of the ink receptive coating by screen printing techniques may be cationic, anionic, nonionic. A preferred surfactant for application by screen printing is a cationic surfactant. A useful solution for application by screen printing may comprise between about 0% and about 50% glycol ether. A preferred solution for application by screen printing may comprise between about 5% and about 40% glycol ether. A particularly preferred solution for application by screen printing may comprise between about 10% and about 35% glycol ether.

Test Methods

Embossing

The foam substrates of the invention were embossed in a nip-form by a magnetic roll and a steel anvil roll. An engraved steel plate was wrapped around the magnetic roll. The magnetic roll and the steel anvil roll were induction heated to the set point. The plate featured raised images 25 to 140 micrometers in height and was made by a chemical etching process (Xynatech, Rio Rancho, N. Mex.). The substrates were passed through the non-gapped closed nip at 1.5 meter/min with pressure being applied to the nip through house air. The combination of heat and pressure compressed the substrates where the images of the steel plate were raised, making thinner, more transparent regions in an exact likeness of the engraved raised images.

Image Transparency

The transparency of the embossed images in the substrates was measured using a Polaroid MP-3 copy stand with a transmitted light base and a Leica DC-300 digital camera fitted with a Tamron 35-80 macro zoom lens. The output of the camera was collected on a personal computer, and analyzed using an ADCIS Aphelion image analysis software package. For each sample of embossed substrate, three neutral density filters with 5%, 10%, and 20% transmittance were placed on a 10 cm×15 cm piece of clean, scratch-free glass in the camera's field of view and a calibration image captured. The filters and the glass were removed and a sample placed on the stand, covered with the piece of glass to keep it flat, and the light transmitted through the embossed image (provided as the ratio of embossed image light/calibrated light) was measured as "Embossed". The light transmitted through the unembossed region of the film was measured as "Background". The image transparency is defined as the Embossed value minus the Background value.

Foam Density (ASTM D792-86)

Foam samples were cut into 12.5 mm×12.5 mm specimens and weighed on a high precision balance (Model AG245 from Mettler-Toledo, Greifensee, Switzerland). The volume of each sample was obtained by measuring the mass of water displaced at room temperature (23±1° C.). The buoyancy of each sample was measured in grams using a special attachment for the balance. The density of the foam was taken to be its mass divided by its buoyancy, assuming the density of water at 23° C. to be 1 g/cm$^3$. The accuracy of the measurement is ±0.02 g/cm$^3$.

Foam Cell Size

Scanning electron microscopy (SEM) was performed on all the foam samples using a scanning electron microscope (Model JSM-35C JEOL USA, Inc., Peabody, Mass.) operated at 5 and 10 kV. The samples were prepared by freezing in liquid nitrogen for 2-5 minutes and subsequently fracturing them. A thin palladium-gold coating was evaporated on the samples to develop a conductive surface. The cell diameters of a minimum of 10 cells were measured and recorded.

Trouser Tear

Trouser tear tests were performed to measure tear propagation resistance at approximately 23° C. using a Sintech Testing Device (MTS, Research Triangle Park, N.C.). Samples were cut out into 57 mm×102 mm specimens, followed by measurement of their thicknesses. Two slits, 25 mm apart and 32 mm long, were cut from one edge of the samples in a direction parallel to the long side. The tab created by doing this was then folded up and clamped in the upper jaw while the bottom two tabs were clamped in the lower jaw. The sample was pulled apart at 254 mm/min tearing along the tab. The average force to propagate the tear along the tab edges was measured. The average tearing force is calculated for the middle 80% of crosshead travel and is the average load divided by two, as there are two slits per sample. A minimum of five replicates was tested for each sample.

Graves Tear

Graves tear tests were performed to measure a combination of tear propagation and initiation resistance at approximately 23° C. on a Sintech Testing Device. Samples were punched out using a Graves Tear dimensioned die, and their thicknesses were measured and recorded. The samples were approximately 100 mm long, 20 mm wide, and have a 90° notch in the middle along which the tear was initiated. The samples were clamped into the Sintech and pulled apart at 254 mm/min and a stress-strain curve was generated. The energy to break (ETB), defined as the area under the curve, was measured. A minimum of six replicates was tested for each sample.

Bending Stiffness

Bending stiffness tests were performed at room temperature on a Handle-O-Meter testing device (Thwing-Albert Instrument Company, Philadelphia, Pa.). Samples were cut into 100 mm squares and their thicknesses was measured and recorded. Samples were forced through a 10 mm slit by a mechanical arm. The peak force required to do this was measured for each sample in both MD and TD. A minimum of six replicates was tested for each sample.

Printability/Ink Adhesion

Foam samples were placed on a heating pad set at 80° C. and allowed to equilibrate for several minutes. Standard black currency ink, obtained from the United States Bureau of Engraving and Printing (BEP, Washington, D.C.), was spread onto the surface of the foam using a #6 Meyer rod at 80° C. The inked foams were then aged for 3 hours at 75° C., which is roughly equivalent to 2 weeks at room temperature as recommended by the BEP. After drying, a 13 mm strip of masking tape (3M Company, St. Paul, Minn.) was rolled down using 3 passes of a 2 kg roller. The test tape was then peeled immediately from the surface of the inked foam at a 90° angle and a rate of 2.8 m/min using a Slip/Peel Tester (Instrumenters, Inc., Strongsville, Ohio). The foams were then rated qualitatively on a scale of 1 to 5 based on the amount of ink removed by the test tape, 1 for no ink removed and 5 for essentially all ink removed. Where noted, the dried and cured ink coating was scored with a set of parallel lines, using two parallel razor blades mounted 1.25 cm apart in a holder. A second set of parallel lines was scored to intersect with the first set at an angle of approximately 90 degrees. The ink test on a scored sample is considered a somewhat more demanding test, as compared with an unscored ink test.

Crumple Evaluation

To evaluate the crumple resistance and recovery of the foam substrate materials, the following technique was used. A modification was made to a Digimatic Indicator Model 1DF-112E (Mitutoyo, Japan), which measures the thickness of materials. A 25.4 mm diameter polycarbonate disc of 7 mm thickness was prepared so as to fit over the 4.83 mm diameter shoe of the Digimatic that resulted in spreading the loading force over a larger area. Thus, for an equivalent spring force, the stress pushing down to measure the foam thickness was 3.6% of the original force. For each 67×67 mm square, five measurements of the original foam or paper thickness, and the thickness of the sample following crumpling, were recorded. These were done at the center and at a position about 15 mm down and in from each corner. The crumpling of the samples was done with an IGT Crumple Tester (Research North America, Cherry Hill, N.J.). Eight crumples were performed by rolling the sample alternately downweb and crossweb. The recovery of the crumpled samples was determined by placing the crumpled samples under flat stainless steel blocks providing a pressure on the sample of 0.7, 1.4 and 2.1 kPa on a machinist's granite table for 24 hr, then measuring the samples again in the 5 positions and averaging.

Overall Opacity

The opacity of the foam samples was measured according to TAPPI Test Method T-425 using a TCS II Spectrophotometer with a Color Sphere, Model 8860 (BYK-Gardner USA, Silver Spring, Md.).

Launderability

The substrates were laundered according to U.S. Bureau of Engraving and Printing Test Method STM 300.002.94a. The wash and rinse water temperature was 62° C.

Comparative Example 1

A commercial polyolefin-based micro-voided synthetic paper (Polyart 75#, Arjobex America, Charlotte, N.C.) with a coating designed for offset printing was tested according to some of the above tests. The overall opacity of this material was 98% and its thickness was 130 microns. The presence of the micro-voids as well as the micro-voiding particles, results in a high opacity making it useful as a paper substitute. The synthetic paper was run through the crumple evaluation and tear tests and its various mechanical properties were determined (see Table 1). The ink adhesion was measured, and a value of 2 was measured for unscored and 3 for scored, corresponding to good ink adhesion (see Table 2).

Comparative Example 2

The synthetic paper of Comparative Example 1 was embossed using the process described above. The material was embossed at 91° C. and a pressure of 39 kg/lineal cm of nip at 1.5 m/min. The embossed images were slightly visible in reflected light and even less noticeable in transmitted light. The image transparency was determined to be 0.1. This value corresponds to very poor transparency, as the images were very difficult to see in transmitted light. A sample of the embossed material was subjected to the crumple evaluation test. The embossed image was extremely difficult to find in the crumpled sample, i.e., the embossed crumpled sample looked very similar to the unembossed crumpled sample of Comparative Example 1, indicating that embossed synthetic paper would not be a viable security element. The image transparency after crumpling was determined to be 0; that is, the crumpled embossed image was unidentifiable from the rest of the crumpled sample. Another sample of this embossed material was subjected to the launderability test described above with similar results, i.e., it was very difficult to tell an embossed laundered sample from an unembossed laundered sample. The launderability and crumpability tests determine if counterfeiters could crumple any non-authentic banknote so that it might pass as an "aged" note. The crumpled embossments were not apparent in either reflected or transmitted light.

Example 1

A mixture of 43% high melt strength polypropylene (Profax™ PF814, Montell North America, Inc., Wilmington, Del.), 40% conventional polypropylene, (PP 3376 Fina Inc., Dallas, Tex.), 15% elastomeric polyethylene, (Affinity™ 8200 Dow Chemical, Midland, Mich.), and 1.5% by weight of FM1307 chemical blowing agent (50% azodicarbonamide loaded in polyethylene) (Ampacet Co., Tarrytown, N.Y.), and 0.5% "Enchanted Forest" concentrate (a 4:1 green pigment/PP ratio, PolyOne Corp.) was extruded in a 6.4 cm single screw extruder (Davis-Standard Corp., Cedar Grove, N.J.) equipped with a Saxton single stage screw at 40 rpm and a temperature profile 144° C.-226° C.-147° C. The exit melt temperature was 134° C., creating an exit pressure of 124 kg/cm² (1760 psi). Approximately half of the extruded mixture was split into two streams using a "T" junction to produce two skin layers in a 20.3 cm feedblock/die assembly at 182° C. A 44 mm Davis Standard single screw extruder was used to feed (23 RPM) the nonfoamed core layer into the die. The core layer consisted of a 75/25 blend of PP 3376 and Wollastonite 520S™ (Fibertec Inc., Bridgewater, Mass.). The wollastonite is a clay filler of high aspect ratio used to increase the bending stiffness of the foam. The resulting foam sheet was cooled on a chrome cast roll at 48° C. equipped with static pinning, and then collected at a linespeed of 1.82 m/min. A foam/non-foam/foam (F/NF/F) construction was produced with a 40/20/40 thickness ratio.

The foam sheet was biaxially oriented using a length orienter (LO) and a tenter with a draw ratio of 2.8 (MD)×5.8 (CD) to a thickness of 140 microns. The temperatures of the LO rolls were 133° C. and the tenter zones were all 166° C. The foamed skins provide a very useful paper-like feel while the nonfoamed core increases the tensile modulus/bending stiffness such that the material is more paper-like in mechanical properties as well.

The foam sheet was corona treated in the presence of nitrogen at 1 J/cm² to improve the ink adhesion. The ink adhesion was measured, and a value of 2 was measured for unscored and 4 for scored, indicating very good ink adhesion (see Table 2).

The colorant in the foam provides a color very similar to the unprinted region of a new US $1 bill.

The oriented foam was opaque and had a paper-like feel due to the foamed skins, as compared to the plastic-like haptic properties of Securency™ banknotes, exemplified by Australian $5 bills (Securency Pty Ltd., Craigieburn, VIC, Australia). In addition, the bending stiffness and tear properties, as measured by trouser and Graves tear tests, are similar to those of a new US $1 bill, providing a clear improvement over printed Securency™. As printing would add thickness to the substrate, the bending stiffness and tear properties of the foam may improve with printing.

Example 2

The multilayer foam of Example 1 was embossed using the process described in the Test Methods section. The material was embossed at 91° C. and a pressure of 39 kg/lineal cm of nip at 1.5 m/min. Embossing did not affect the overall opacity, bending stiffness, or tear properties of the foamed material. The images were embossed, with transparent indicia from the 140-micron features and a textured area from the shorter features. The textured embossed regions were slightly identifiable in reflected light and very identifiable in transmitted light, providing a watermark-type security feature. The image transparency was measured to be 0.26. This corresponds to a good image transparency, as the images were apparent in reflected and transmitted light.

After subjecting the foamed material to the Crumple Evaluation test, the sample was 173 micrometers thick in some spots, and remained 150 micrometers thick after smoothing with 2.1 kPa force, as compared to a thickness of 130 micrometers for the uncrumpled sample. The embossed security element remained intact, unlike the embossment made in Comparative Example 2. The image transparency of the embossed, and then crumpled sample was measured to be 0.24. The embossed image survived crumpling much better than the synthetic paper of Comparative Example 2.

Example 3

A mixture of 43.5% high melt strength polypropylene (Profax™ PF814, Montell North America, Inc., Wilmington, Del.), 40% conventional polypropylene, (PP 3376 Fina Inc., Dallas, Tex.), 15% elastomeric polyethylene, (Affinity™ 8200 Dow Chemical, Midland, Mich.), and 1.5% by weight of FM1307 chemical blowing agent (50% azodicarbonamide loaded in polyethylene) (Ampacet Co.) was extruded in a 6.4 cm single screw extruder equipped with a Saxton single stage screw at 40 rpm and a temperature profile of 138° C.-224° C.-148° C. The exit melt temperature was 137° C., and the exit pressure was 16.6 MPa. Approximately half of the extruded mixture was split into two streams using a "T" junction to produce two skin layers in a 20.3 cm feedblock/die assembly at 182° C. A 38 mm Davis Standard single screw extruder was used to feed (23 RPM) a nonfoamed core layer into the die. The core layer consisted of a 74/25/1 blend of PP 3376, Wollastonite 520S, and Signal Green fluorescent colorant (Day-Glo, Cleveland, Ohio). The resulting foam sheet was cooled on a chrome cast roll at 16° C. at a linespeed of 2.81 m/min. A foam/non-foam/foam (F/NF/F) construction was produced with a 40/20/40 thickness ratio. The foam sheet was oriented using an LO and tenter at a draw ratio of 3 (MD)×4.5 (CD) to a thickness of 140 micrometers. The temperatures of the LO rolls were 133° C. and the tenter zones were set to 160° C. The oriented foam was embossed as described above in the Test Methods section. The foam material was embossed at 91° C. and a pressure of 39 kg/lineal cm of nip at 1.5 m/min. The images were embossed with transparent indicia from the 140-micron features and a textured area from the shorter features. The textured embossed regions were slightly identifiable in reflected light and very identifiable in transmitted light, providing a watermark-type security feature.

The image transparency was measured to be 0.38 indicating an excellent image transparency as the images were readily apparent in both reflection and transmission. This feature was maintained through the crumple test, as the image transparency of the embossed sample after the test was 0.36. The embossed image survived crumpling significantly better than the synthetic paper of Comparative Example 2.

The tear and bending stiffness properties of the oriented foam were measured, and the results compared to a new US $1 bill and a new Australian $5 note in Table 1. The results were similar before and after embossing. The mechanical properties are very similar to those of a new US $1 bill.

The fluorescent colorant in the core layer was added as a covert security element. It was undetectable under ambient lighting conditions but fluoresced a bright green color when irradiated with UV light. Under UV light inspection, there was heightened contrast between the embossed and unembossed regions, the embossed regions appearing darker against the bright green background.

The oriented foam was corona treated in the presence of nitrogen at 1 J/cm² to improve ink adhesion. The ink adhesion was measured, with a value of 2 for both unscored and scored, corresponding to very good ink adhesion (see Table 2).

Example 4

A laminate was prepared using two foam layers and a multilayer optical film (MOF) in a F/MOF/F sandwich. A mixture of 78% high melt strength polypropylene (Profax™ PF814, Montell North America, Inc., Wilmington, Del.), 7.5% conventional polypropylene, (PP 3376 Fina Inc., Dallas, Tex.), 10% elastomeric polyethylene, (Affinity™ 8200 Dow Chemical, Midland, Mich.), 2.5% wollastonite 520S, and 2.0% by weight of FM1307 chemical blowing agent (50% azodicarbonamide loaded in polyethylene) (Ampacet Co.,) was extruded in a 6.4 cm single screw extruder equipped with a Saxton single stage screw at 40 rpm and a temperature profile of 138° C.-226° C.-138° C. The exit melt temperature was 132° C., and the exit pressure was 84 kg/cm² (1200 psi). Approximately half of the extruded mixture was split into two streams using a "T" junction in a 20.3 cm feedblock/die assembly at 182° C. There was no nonfoam core layer for this sample. The resulting foam sheet was cooled on a chrome cast roll at 38° C. at a line speed of 5.05 m/min. The foam material was oriented using an LO and tenter at a draw ratio of 2.8 (MD)×6.5 (CD) to a thickness of 64 microns. The temperatures of the LO rolls were 133° C. and the tenter zones were set to 155° C.

The multilayer optical film (MOF) was Radiant Light Film CM590 (3M Co., St. Paul, Minn.) cut into 10 mm wide strips. The MOF and foam were laminated together using a polyethylene-acrylic acid copolymer (EAA, Bynel 3101, Dupont, Wilmington, Del.) 8 micron film as an adhesive layer. The EAA film was laid on top of the foam, and the MOF strips were laid in the MD with 150 mm gaps between strips. The EAA sheet and a foam layer were placed on top to generate an F/EAA/MOF/EAA/F construction. This material was passed through a laminator at 129° C., 0.28 MPa, and a linespeed of 3.1 m/min. In reflected light, the strips appeared to be yellow-orange in color; however, in transmitted light (i.e., holding this construction up to a light source), the strips were light blue, providing a rapid, unique verification of authenticity.

Comparative Example 3

The synthetic paper (SP) of Comparative Example 1 was laminated to the MOF strips and EAA film at the same conditions as used in Example 4 to produce an SP/EAA/MOF/EAA/SP construction. The high opacity of the synthetic paper prevented any optical effects from the MOF to be discernable in reflected or transmitted light.

Example 5

The foam laminate of Example 4 was embossed using the process described in the Test Methods section. The laminate was embossed at 91° C. and a pressure of 39 kg/lineal cm of nip at 1.5 m/min. The images were embossed, providing a unique optical security element. The indicia from the 140-micron features were multi-colored with a gold-leaf look in reflected light. The indicia was multi-colored in transmitted light (i.e., when holding the embossed image to a light source) with green, blue, and purple being visible. The difference in transmitted color between the unembossed and embossed sample of Example 4 is due to the compression of the MOF layers, which changes the optical properties of the film.

Comparative Example 4

The SP/EAA/MOF/EAA/SP laminate construction of Comparative Example 4 was embossed using the process described above in the Test Methods section. The laminate was embossed at 91° C. and a pressure of 39 kg/lineal cm of nip at 1.5 m/min. The high opacity of the synthetic paper prevented any optical effects from the MOF to be discernable in reflected or transmitted light in either the embossed or nonembossed regions Example 6

A laminate was prepared as in Example 4 except the multilayer optical film was flame embossed using the process described in U.S. Pat. No. 6,096,247. The film was passed at 80 meter/min over an open natural-gas powered flame (50 BTU/hr) provided by a ribbon burner (Flynn Burner Corporation, New Rochelle, N.Y.) at an air:fuel setpoint ratio of 9.6. The backside of the film was in contact with a chill roll covered with chlorosulfonated elastomer (American Roller Company, Union Grove, Wis.). The film was then embossed at 93° C. and a pressure of 6.2 kg/cm².

The flame embossed MOF and foam layers were then laminated and embossed using the same procedure and conditions as in Example 4. The indicia from the 140-micron features were multi-colored with a gold-leaf look in reflected light. In reflected light, the MOF strips appeared to be yellow-orange in color; however, in transmitted light the strips are light blue, providing a rapid, unique verification of authenticity. The flame embossed images in the MOF were also observable in transmission, providing even higher levels of security.

Example 7

The process described in U.S. Pat. No. 6,447,875 was used to provide a security element via embedded cores in a foam matrix. The cores consisted of 3376 polypropylene pigmented with 5% blue colorant (Ampacet Co.). The cores were coextruded into a melt mixture of 38% Profax™ PF814 polypropylene, 20% Affinity™ 8200 polyethylene, 38% PP 3376 polypropylene, and 4% by weight of FM1307H chemical blowing agent. The blue cores were extruded with a 4.4 cm Killion single screw extruder at 56 rpm and 232° C. The matrix-forming materials were mixed and melted in a 6.4 cm single screw extruder (Davis-Standard Corp.) equipped with a Saxton single stage screw at 35 rpm and a temperature profile of 132° C.-237° C.-165° C. The exit melt pressure was 26 MPa. The two extruders were connected to a 457 mm "core" die which was operated at 193° C. The core die was similar to those described in the '875 patent. The extruded foam sheet, having internal colored unfoamed cores, was cooled on a chrome cast roll at 32° C. at a linespeed of 1.6 m/min. The extrudate had a density of 0.5 g/cc and a thickness of 1.27 mm. The included cores were 3.0 mm wide by 0.28 mm thick.

The coextruded foam was then simultaneously oriented in both the machine (MD) and cross (CD) directions using a Karo IV batch orienter (Bruckner GmbH) at a draw ratio of 5 (MD) by 5 (CD). The temperature of the orienter was 155° C. The oriented foam was 0.05 mm thick in the areas without cores, and 0.127 mm in the areas where the cores were present. The included cores were 9.27 mm wide. The thickness of the cores could not be determined. The cores were very visible in both reflected and transmitted light at the surface of the foam, providing a watermark-type of security element.

Example 8

A coextruded film was prepared as in Example 7 except the matrix consisted only of 3376 polypropylene without any foaming agent. The blue cores were extruded with a 4.4 cm Killion single screw extruder at 25 rpm and 232° C. The matrix-forming polypropylene was mixed and melted in a 6.4 cm single screw extruder (Davis-Standard Corp.) equipped with a Saxton single stage screw at 35 rpm and a temperature profile of 137° C.-215° C.-232° C. The exit melt pressure was 20 MPa. The two extruders were connected to a 457 mm "core" die which was operated at 193° C. The core die was similar to those described in the '875 patent. The extruded foam sheet, having internal colored unfoamed cores, was cooled on a chrome cast roll at 32° C. at a linespeed of 3.5 m/min. The extrudate had a density of 0.5 g/cc and a thickness of 0.279 mm. The included cores were 1.54 mm wide. The thickness of the cores could not be accurately determined.

The coextruded film was then simultaneously oriented in both the machine (MD) and cross (CD) directions using a Karo IV batch orienter (Bruckner GmbH) at a draw ratio of 5 (MD) by 5 (CD). The temperature of the orienter was 155° C. The oriented film was 0.0152 mm thick in the areas without cores. The included cores were 6.35 mm wide. The cores were slightly visible in transmitted light through one layer of film, and readily apparent when looking through two layers of film. The oriented film was then laminated between two layers of the single-layer foam prepared in Example 4 using Spraymount adhesive (3M Co., St. Paul, Minn.). The blue core was visible through the foam layers, particularly in transmitted light, providing a watermark-type of security element.

Example 9

A blend of 95% 3376 polypropylene and 5% red pigment masterbatch (Polyone, Elk Grove Village, Ill.) was melt mixed using a small-scale Haake conical twin screw extruder at 200° C. and then pelletized. The pellets were then pressed into 0.635 mm thick sheets using a hot press at 200° C. and 352 kg/cm$^2$ (5000 psi) and then oriented 4 times in both the machine and cross directions using the Karo IV orienter, resulting in 0.025 mm thick films. A 1.0 cm wide strip of this material was then laminated between two layers of the single-layer foam prepared in Example 4 using Spraymount adhesive (3M Co., St. Paul, Minn.). The red core was visible through the foam layers in both reflected and transmitted light, providing a watermark-type of security element.

Example 10

A blend of 95% 3376 polypropylene and 5% phosphorescent pigment (United Mineral & Chemical Corp., Lyndhurst, N.J.) was melt mixed using a small-scale Haake conical twin screw extruder at 200° C. and then pelletized. The pellets were then pressed into 0.635 mm thick sheets using a hot press at 200° C. and 352 kg/cm$^2$ (5000 psi) and then oriented 4 times in both the machine and cross directions using the Karo IV orienter, resulting in 0.025 mm thick films. A 1.0 cm wide strip of this material was then laminated between two layers of the single-layer_foam prepared in Example 4 using Spraymount adhesive (3M Co., St. Paul, Minn.). The core was invisible in reflected and transmitted light, but glowed a greenish-blue color when placed under a UV ("black") lamp.

TABLE 1

| Sample ID | Bending Stiffness (N) | Trouser Tear (N) | Graves ETB (N-mm) | Opacity of Unprinted Region (%) | Thickness (μm) |
|---|---|---|---|---|---|
| Comp Ex 1 | 68 | 0.7 | 110 | 98 | 130 |
| New US $1 | 85 | 1.0 | 10 | 94 | 125 |
| Securency (Aussie $5) | 60 | 0.3 | 12 | 91 | 130 |
| Euro 5 | 54 | 0.7 | 5 | 94 | 110 |
| Ex 1 | 93 | 0.6 | 25 | 92 | 125 |
| Example 2 | 53 | 0.6 | 25 | 94 | 125 |

TABLE 2

Ink Adhesion Results

| Example | Surface Treatment | Adhesion Test | Scored Adhesion Test |
|---|---|---|---|
| Comp Ex 1 | "Offset Coated" | 2 | 4 |
| Ex 1 | Corona Treated | 2 | 3 |
| Ex 3 | Corona Treated | 2 | 2 |
| Embossed Ex 3 | Corona Treated | 2 | 2 |

Preparative Examples 1 to 3 and Comparative Example 5

Preparative Example 1

A melt mixture of 67% high melt strength polypropylene (Profax PF814™, Montell North America, Inc., Wilmington, Del.), 28% elastomeric copolyethylene, Affinity 8200 (Dow Chemical, Midland, Mich.), and 5% by weight of FM1307H™ chemical blowing agent (50% azodicarbonamide loaded in polyethylene) (Ampacet Co., Cincinnati, Ohio) was prepared in a 5.1 cm single screw extruder (SSE) (Davis-Standard Corp., Cedar Grove, N.J.) equipped with a Saxton single stage screw at 60 rpm and a temperature profile from 135 to 221 to 141° C. The exit melt temperature was 141° C., creating an exit pressure of 11 MPa. The melt mixture was extruded into the core of a 203 mm single layer die at 160° C. with no skins. The resulting foam sheet was cooled on a chrome cast roll at 67° C., then collected at a draw rate of 2.5 m/min. The foam had a density of 0.5 g/cc at a thickness of 1.65 mm. A single layer foam was created with cell sizes slightly elongated in the machine direction (MD), the cells measuring approximately 20×80 micrometers and 40-60 micrometers in the cross direction (CD).

This foam was oriented in the machine direction (MD) using a length orienter (LO) and in the transverse direction (CD) using a tenter at a draw ratio of 3 (MD)×6 (CD). The temperature of the LO rolls was 130° C. and the tenter zones were all 158° C. The resulting oriented foam sample was designated sample A4-5. The density of the oriented foam was 0.50 g/cc. The oriented foam was opaque and had a paper-like feel due to the soft, skinless surface, as opposed to the plastic-like haptic properties of Securency™ banknotes, exemplified by Australian $5 bills (Securency Pty Ltd., Craigieburn, VIC, Australia).

Preparative Example 2

A melt mixture of 98.0% Profax PF814 and 2.0% FM1307H™ was prepared in a 60 mm twin screw extruder (Berstorff, Florence, Ky.) at 84 rpm and a temperature profile from 180 to 230 to 150° C. The exit melt temperature was 167° C., creating an exit pressure of 82.2 bar. The melt mixture was extruded into the core of an 457 mm 5-layer vane die at 175° C. A 64 mm Davis Standard SSE at 41 rpm and a 51 mm Davis Standard SSE at 75 rpm were used to feed into the die two skin layers, which consisted of isotactic polypropylene, PP 3571™ (Fina Inc., Dallas, Tex.). The resulting foam sheet was cooled on a partially water-immersed chrome cast roll at 20° C. at 3.1 m/min. A three-layer foam was created with foam cell sizes noticeably elongated in the machine direction, the cells measuring 20×80 micrometers. The skin/core/skin thickness ratio was approximately 12:76:12.

This foam was biaxially oriented in simultaneous fashion using a Bruckner LISIM line (Bruckner Inc.) at a draw ratio of 5.4 (MD)×4.7 (CD). The temperature of the tenter oven went from 174° C. to 161° C. to 154° C. to 151C. The resulting oriented foam was designated as sample 257-7. The density of the oriented foam was 0.50 g/cc and the thickness was 95 micrometers. Due to the skins, the oriented foam had a glossier surface and a plastic-like feel, although it was still more paper-like than Securency™.

Preparative Example 3

A melt mixture of 49% Profax PF814™, 34.5% PP 3376™, 15% elastomeric Affinity 8200™, and 1.5% FM1307H™ was prepared in a 6.3 cm single screw extruder (Davis-Standard) equipped with a Saxton single stage screw at 40 rpm and a temperature profile from 145 to 233 to 148° C. The exit melt temperature was 129° C., creating an exit pressure of 10.4 MPa. The melt mixture was split into two gear pumps (each at 60 rpm and 160° C.) through a "T" junction and sent into the skins of a 25.4 cm 3-layer vane die at 160° C. A 25 mm Berstorff twin screw extruder at 150 rpm with a gear pump running at 80 rpm fed into the die the core nonfoam layer, which consisted of 50/25/25 blend of Affinity 8200/PP 3376/Wollastonite 520S™ (Fibertec Inc., Bridgewater, Mass.), wollastonite being a clay filler of high aspect ratio used to increase the bending stiffness of the foam. This particular grade of wollastonite is silane surface treated to achieve good bonding to polypropylene so that little additional voiding should occur. The resulting foam sheet was cooled on a chrome cast roll at 38° C., and then collected at a draw rate of 2.9 m/min. The foam had a density of 0.65 g/cc at a thickness of 1.3 mm. A foam/non-foam/foam construction was created with balanced foam skins (40/20/40 thickness ratio). The foam cell sizes are slightly elongated, measuring approximately 20×60 micrometers in the MD and 40×40 micrometers in the CD.

This foam was oriented using an LO and tenter at a draw ratio of 2.5 (MD)×5.8 (CD) to a thickness of 102 micrometers. The temperature of the LO rolls was 135° C. and the tenter zones were all 166° C. The foam entered the LO at 1.2 m/min. The density of the oriented foam was 0.5 g/cc. The resulting oriented foam was given the designation of sample number 1588-30. The foam had a feel similar to that of Example 1, although its color was a unique opalescent blue due to the unfoamed colored clay-filled core. As can be seen from Table 1, the bending stiffness is considerably higher than that of Example 1 due to the presence of the middle unfoamed layer. In fact, the bending stiffness is even higher than that in Example 2 which has "stiff" PP skins on the outside of the foam. In addition, the foam feels more paper-like than that of Preparative Example 2 since there are no skin layers on this foam with tear properties very similar to or better than a new US $1 bill.

Surface Smoothness

The surface smoothness of the foams of Preparative Examples 1, 2 and 3 and Comparative Example 5 were measured by using a contact stylus profilometer (Veeco Metrology Group, Chadds Ford, Pa., Model Dektak 8). The stylus used was a 12.5 micrometer radius diamond probe (45 degree angle). The force used was 6 milligrams, scan time (for 5 mm scan) was 20 seconds per scan. A total of 394 lines were scanned to create the 3D image of a 5 mm×5 mm sample area. For comparative purposes (Comparative Example 5), a microfibrillated foam surface, prepared as described in U.S. Pat. No. 6,468,451 (Perez et al.), was also measured. The results are reported in Table 3. In Table 3, the following measured/calculated values, according to ANSI B46.1, are reported:

$R_A$—the average surface roughness calculated over the entire measured array, $R_q$—the root-mean-square roughness calculated over the entire measured array, $R_Z$—the average of the ten great peak-to-valley separations in the sample, $R_t$—the peak to valley difference over the entire measured array, $R_v$—the maximum profile valley depth; the height difference between the mean line and the lowest point over the entire evaluation length, $R_{vm}$—the maximum profile valley depth; the average of the successive $R_v$ values over the evaluation length, $R_{pm}$—the average maximum profile peak height; the average of the successive $R_p$ values over the evaluation length.

| Sample | $R_A$ (μm) | $R_q$ (μm) | $R_Z$ (μm) | $R_t$ (μm) | $R_v$ (μm) | $R_{vm}$ (μm) | $R_{pm}$ (μm) |
|---|---|---|---|---|---|---|---|
| Prep. Ex. 1 | 2.62 | 3.25 | 22.5 | 24.1 | −11.22 | −13.35 | 12.15 |
| Prep. Ex. 2 | 1.22 | 1.54 | 9.77 | 10.14 | −4.80 | −4.66 | 5.11 |
| Prep. Ex. 3 | 2.38 | 3.02 | 21.31 | 23.45 | −12.66 | −11.95 | 9.36 |

-continued

| Sample | $R_A$ (μm) | $R_q$ (μm) | $R_Z$ (μm) | $R_t$ (μm) | $R_v$ (μm) | $R_{vm}$ (μm) | $R_{pm}$ (μm) |
|---|---|---|---|---|---|---|---|
| C-5 Fibrillated foam | 22.75 | 28.63 | 243.87 | 272.73 | −152.24 | −140.68 | 103.19 |

The invention claimed is:

1. A security substrate comprising at least one oriented, high melt-strength polypropylene foam layer comprising homo- and copolymers containing 50 weight percent or more propylene monomer units, and having a melt strength in the range of 25 to 60 cN at 190° C. and at least one security element which provides visual, tactile or electronic authentication of the security substrate or a security document derived therefrom, said foam layer having two substantially smooth major surfaces wherein the foam layer has an $R_A$ value of <10 according to ANSI B46.

2. The security substrate of claim 1 wherein said foam layer having a cellular morphology through the thickness of the layer.

3. The security substrate of claim 1 wherein said security element is a visual security element that changes appearance in a reversible, predictable and reproducible manner by the application of heat or pressure, by variation in the angle of viewing, or by the adjustment of lighting conditions.

4. The security substrate of claim 3 wherein said visual security element is selected from the group of printed indicia, reverse printing, color shifting, metameric, polarizing, fluorescent, luminescent, phosphorescent, pearlescent, holographic, reflective, metallic, magnetic films, threads, particles or fibers; watermarks, transparent or translucent regions, liquid crystals; optical lenses, microlenses, Fresnel lenses, optical filters, polarizing filters, photochromic elements, thermochromic elements, Moiré patterns, refractive, lenticular and transparent grids, embossed elements or other three-dimensional elements, and combinations of the above.

5. The security substrate of claim 1 wherein said security element is an embossment.

6. The security element of claim 5 wherein said embossment provides a substantially transparent region.

7. A multilayer article comprising the foam layer of claim 1 and at least one thermoplastic film layer.

8. The multilayer article of claim 7 wherein said security element is integral to said thermoplastic film layer.

9. The multilayer article of claim 7 wherein said security element is integral to said foam layer.

10. The multilayer article of claim 7 wherein said security element layer in the thermoplastic film layer is revealed through a substantially transparent region in said foam layer.

11. The multilayer article of claim 7 comprising at least two security elements, which in registration, provide a visual security element.

12. The multilayer article of claim 7, wherein said security element comprises at least one core embedded in the thermoplastic film layer.

13. The multilayer article of claim 12 wherein said security element is coextruded with said foam layer by an inclusion coextrusion process.

14. The multilayer article of claim 7 having two high melt-strength, oriented polymer foam layers and a thermoplastic film layer disposed therebetween.

15. The multilayer article of claim 7 wherein said thermoplastic film layer is coextruded with said foam layer.

16. The multilayer article of claim 7 wherein said thermoplastic film layer is laminated to said foam layer.

17. The multilayer article of claim 7 comprising said thermoplastic film layer and said high melt strength foam layer, the multilayer article having a bending stiffness of at least 40 Newtons.

18. The security substrate of claim 1 comprising a security element on a surface of said foam layer.

19. The security substrate of claim 1 comprising a security element dispersed in said foam layer.

20. The security substrate of claim 1 wherein said security element is laminated to said foam layer.

21. A security document comprising the substrate of claim 1.

22. The security substrate of claim 1 wherein the foam has an average cell size of less than 100 micrometers, prior to orientation.

* * * * *

UNITED STATES PATENT AND TRADEMARK OFFICE
CERTIFICATE OF CORRECTION

| | | |
|---|---|---|
| PATENT NO. | : 7,820,282 B2 | Page 1 of 1 |
| APPLICATION NO. | : 11/694350 | |
| DATED | : October 26, 2010 | |
| INVENTOR(S) | : Christopher K Haas | |

It is certified that error appears in the above-identified patent and that said Letters Patent is hereby corrected as shown below:

Page 2, Column 2,
Under "Other Publications", delete "Bioaxially" and insert -- Biaxially --.

Column 10,
Line 11, delete "thereof," and insert -- thereof; --.
Lines 13-14, delete "Wilimington," and insert -- Wilmington, --.

Column 19,
Line 55, delete "inegral" and insert -- integral --.

Column 21,
Line 20, after "length," delete "of".

Column 22,
Line 30, delete "fluoresent," and insert -- fluorescent, --.
Line 30, delete "phosphoresecent," and insert -- phosphorescent, --.

Column 30,
Line 39, after "regions" insert -- . --.

Column 33,
Line 42, delete "151C." and insert -- 151°C. --.

Signed and Sealed this
First Day of February, 2011

David J. Kappos
*Director of the United States Patent and Trademark Office*